(12) United States Patent
Zhang

(10) Patent No.: US 12,279,114 B2
(45) Date of Patent: Apr. 15, 2025

(54) DATA INFORMATION OBTAINING METHOD AND APPARATUS

(71) Applicant: Tencent Technology (Shenzhen) Company Limited, Guangdong (CN)

(72) Inventor: Zhuoyun Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 182 days.

(21) Appl. No.: 17/979,094

(22) Filed: Nov. 2, 2022

(65) Prior Publication Data

US 2023/0049810 A1 Feb. 16, 2023

Related U.S. Application Data

(63) Continuation of application No. PCT/CN2021/129186, filed on Nov. 8, 2021.

(30) Foreign Application Priority Data

Dec. 7, 2020 (CN) .......................... 202011419510.4

(51) Int. Cl.
*H04W 12/069* (2021.01)
(52) U.S. Cl.
CPC ................................ *H04W 12/069* (2021.01)
(58) Field of Classification Search
CPC ..... H04W 12/069; H04L 63/205; H04L 63/08
See application file for complete search history.

(56) References Cited

U.S. PATENT DOCUMENTS

2018/0270778 A1* 9/2018 Bharatia ............. H04L 65/1073
2019/0053295 A1* 2/2019 Castellanos Zamora ....................
 H04W 60/00

(Continued)

FOREIGN PATENT DOCUMENTS

CN 109587187 4/2019
CN 109842895 6/2019
(Continued)

OTHER PUBLICATIONS

Mijumbi, Rashid, et al. "Network function virtualization: State-of-the-art and research challenges." IEEE Communications surveys & tutorials 18.1 (2015): 236-262.*

(Continued)

*Primary Examiner* — Jimmy H Tran
(74) *Attorney, Agent, or Firm* — Crowell & Moring

(57) ABSTRACT

This disclosure relates to method and apparatus for obtaining data information. The method includes: obtaining a capability invocation subscription request transmitted by a second function network element based on subscription request parameter information, the subscription request parameter information being determined according to authentication response parameter information, the authentication response parameter information being obtained by a network exposure function device performing authentication processing on a capability invocation request, and the capability invocation request being transmitted by the second function network element based on a first subscription rule; obtaining access parameter information from the subscription request parameter information, and performing subscription verification on the capability invocation subscription request based on the access parameter information; and generating capability invocation subscription response information for the capability invocation subscription request, and transmitting the capability invocation subscription response information to the second function network element.

4 Claims, 10 Drawing Sheets

(56) References Cited

U.S. PATENT DOCUMENTS

| | | | |
|---|---|---|---|
| 2019/0261260 A1* | 8/2019 | Dao | H04W 48/00 |
| 2020/0213290 A1* | 7/2020 | Tan | H04L 9/32 |
| 2020/0259896 A1* | 8/2020 | Sachs | H04W 56/0065 |
| 2020/0287800 A1* | 9/2020 | Xu | H04W 24/02 |
| 2020/0296571 A1* | 9/2020 | Puente Pestaña | H04W 8/18 |
| 2020/0322775 A1* | 10/2020 | Lee | H04W 8/02 |
| 2020/0366567 A1* | 11/2020 | Li | H04L 41/5019 |
| 2021/0007166 A1* | 1/2021 | Liao | H04W 48/16 |
| 2021/0099364 A1* | 4/2021 | Bartolomé Rodrigo | H04L 69/26 |
| 2021/0120409 A1* | 4/2021 | Nair | H04L 9/0844 |
| 2021/0273856 A1* | 9/2021 | Marquezan | H04L 41/142 |
| 2021/0274392 A1* | 9/2021 | Dao | H04W 36/0033 |
| 2021/0306231 A1* | 9/2021 | Lee | H04L 41/14 |
| 2021/0329460 A1* | 10/2021 | Liao | H04W 12/37 |
| 2021/0385737 A1* | 12/2021 | Bartolomé Rodrigo | H04W 48/16 |
| 2022/0015023 A1* | 1/2022 | De-Gregorio-Rodriguez | H04W 48/18 |
| 2022/0030537 A1* | 1/2022 | Wei | H04W 60/00 |
| 2022/0104162 A1* | 3/2022 | Aggarwal | H04L 67/51 |
| 2022/0124469 A1* | 4/2022 | Liao | H04L 67/34 |
| 2022/0141647 A1* | 5/2022 | Castellanos Zamora | H04W 8/04 455/418 |
| 2022/0141662 A1* | 5/2022 | Liao | H04W 12/37 726/1 |
| 2022/0159542 A1* | 5/2022 | Zhou | H04W 36/0022 |
| 2022/0225095 A1* | 7/2022 | Zhu | H04W 8/18 |
| 2022/0294723 A1* | 9/2022 | Lee | H04L 43/0817 |
| 2022/0337995 A1* | 10/2022 | Baek | H04W 8/02 |
| 2023/0054571 A1* | 2/2023 | Wang | H04W 4/70 |
| 2023/0113108 A1* | 4/2023 | Tao | H04W 12/06 455/418 |
| 2023/0113519 A1* | 4/2023 | Fernandez Alonso | H04W 76/25 370/329 |
| 2023/0135699 A1* | 5/2023 | Liao | H04W 4/50 370/252 |
| 2023/0164194 A1* | 5/2023 | Foti | H04W 8/205 370/329 |
| 2023/0164591 A1* | 5/2023 | Sun | H04M 15/66 370/259 |
| 2023/0217241 A1* | 7/2023 | Velev | H04W 8/20 455/414.1 |
| 2023/0283990 A1* | 9/2023 | Qiao | H04W 4/023 455/456.3 |
| 2023/0354007 A1* | 11/2023 | Garcia Martin | H04W 48/18 |
| 2023/0370344 A1* | 11/2023 | Lee | H04L 65/40 |
| 2023/0370834 A1* | 11/2023 | Xu | H04W 48/16 |
| 2024/0137848 A1* | 4/2024 | Yao | H04L 41/5009 |
| 2024/0251371 A1* | 7/2024 | Wei | H04L 67/56 |
| 2024/0323662 A1* | 9/2024 | Zhang | H04L 45/302 |

FOREIGN PATENT DOCUMENTS

| | | |
|---|---|---|
| CN | 110474875 A | 11/2019 |
| CN | 111182568 | 5/2020 |
| CN | 111684824 | 9/2020 |
| CN | 112437435 | 3/2021 |
| EP | 3 570 515 A1 | 11/2019 |
| EP | 3 993 485 A1 | 5/2022 |
| WO | WO 2018/169382 A1 | 9/2018 |

OTHER PUBLICATIONS

Gupta, Akhil, and Rakesh Kumar Jha. "A survey of 5G network: Architecture and emerging technologies." IEEE access 3 (2015): 1206-1232.*

Cox, Jacob H., et al. "Advancing software-defined networks: A survey." Ieee Access 5 (2017): 25487-25526.*

Bakhshi, Taimur. "State of the art and recent research advances in software defined networking." Wireless Communications and Mobile Computing 2017.1 (2017): 7191647.*

Office action issued in Korean application No. 10-2023-7019153, dated Oct. 31, 2024, 6 pages (with English translation).

Office Action issued on Apr. 28, 2024 in related Chinese Patent Application No. 202011419510.4 w/English translation (14 pages).

Supplementary European Search Report, dated Feb. 8, 2024, pp. 1-9, issued in European Patent Application Number 21902296.9-1218/4236409 PCT/CN2021129186, European Patent Office, Munich, Germany.

International Search Report issued Jan. 27, 2002 in International (PCT) Application No. PCT/CN2021/129186.

* cited by examiner

DATA INFORMATION OBTAINING METHOD AND APPARATUS

RELATED APPLICATION

This application is a continuation application of PCT Patent Application No. PCT/CN2021/129186, filed on Nov. 8, 2021, which claims priority to Chinese Patent Application No. 2020114195104, entitled "DATA INFORMATION OBTAINING METHOD AND APPARATUS, AND RELATED DEVICE AND MEDIUM" filed with the China National Intellectual Property Administration on Dec. 7, 2020, wherein the content of each of the above-referenced applications is incorporated herein by reference in its entirety.

FIELD OF THE TECHNOLOGY

This disclosure relates to the field of communication technologies, and specifically, to a data information processing technology in the 5th generation mobile network (5G) technologies.

BACKGROUND OF THE DISCLOSURE

In the core network of the 5G system, there is a network exposure function device that has functions of collecting, analyzing, and reorganizing network capabilities. The network exposure function device is specifically a network exposure function (NEF) entity that can support one or more functions. In practical applications, network elements of the 5G core network and external network elements each need to notify the NEF entity of a network service capability thereof, so that each network element can obtain service capability information of a network element of interest through the NEF entity.

In the current 5G system, it is difficult to directly exchange data between network elements in an external network and network elements in the internal network (that is, the 5G core network), and information conversion and exchange between the external network and the internal network (the 5G core network) need to be implemented through the NEF entity, which reduces the efficiency of information obtaining between the network elements.

SUMMARY

The embodiments of this disclosure provide a data information obtaining method and apparatus, a related device, and a related medium, which can improve the efficiency of information obtaining between network elements.

According to an aspect of the embodiments of this disclosure, a data information obtaining method is provided, performed by a first function network element. The method includes:

obtaining a capability invocation subscription request transmitted by a second function network element based on subscription request parameter information, the subscription request parameter information being determined by the second function network element according to received authentication response parameter information, the authentication response parameter information being obtained by a network exposure function device performing authentication on a capability invocation request, and the capability invocation request being transmitted by the second function network element;

obtaining, from the subscription request parameter information carried in the capability invocation subscription request, access parameter information for requesting access to the first function network element, and performing subscription verification on the capability invocation subscription request based on the access parameter information; and generating, in response to the subscription verification succeeding, capability invocation subscription response information for the capability invocation subscription request, and transmitting the capability invocation subscription response information to the second function network element, the capability invocation subscription response information being for indicating that the second function network element has access to the first function network element.

According to an aspect of the embodiments of this disclosure, a data information obtaining method is provided, performed by a first function network element. The method includes:

receiving a capability invocation request forwarded by a network exposure function device, the capability invocation request being generated by a second function network element, and the capability invocation request carrying request parameter data information;

obtaining the request parameter data information from the capability invocation request, and performing authentication on the capability invocation request based on the request parameter data information; and generating, in response to determining that the authentication of the capability invocation request succeeds, request response parameter information for the capability invocation request, and sending the request response parameter information to the second function network element by using the network exposure function device, the request response parameter information being used for indicating that a second function network element has access to the first function network element.

According to an aspect of the embodiments of this disclosure, a data information obtaining method is provided, performed by a second function network element. The method includes:

receiving authentication response parameter information returned by a network exposure function device, and determining subscription request parameter information based on the authentication response parameter information, the authentication response parameter information being obtained by the network exposure function device performing authentication on a capability invocation request transmitted by the second function network element;

adding the subscription request parameter information to a capability invocation subscription request, and transmitting the capability invocation subscription request to a first function network element such that the first function network element performs subscription verification on the capability invocation subscription request according to access parameter information in the subscription request parameter information; and receiving capability invocation subscription response information returned by the first function network element in response to the subscription verification succeeding, and accessing the first function network element based on the capability invocation subscription response information.

According to an aspect of the embodiments of this disclosure, a data information obtaining method is provided, performed by a second function network element. The method includes:

transmitting a capability invocation request to a network exposure function device, so that the network exposure function device forwards the capability invocation request to a first function network element, the first function network element being configured to perform authentication on the capability invocation request based on request parameter data information carried in the capability invocation request; and receiving request response parameter information returned by the first function network element by using the network exposure function device when the authentication succeeds, the request response parameter information being used for indicating that the second function network element accesses the first function network element.

According to an aspect of the embodiments of this disclosure, a computer device is provided, including: a processor and a memory, the processor being connected to the memory, the memory being configured to store a computer program, and the computer program, when executed by the processor, causing the computer device to perform the methods according to the embodiments of this disclosure.

According to an aspect of the embodiments of this disclosure, a computer-readable storage medium is provided, storing a computer program, the computer program being suitable to be loaded and executed by a processor, to cause a computer device having the processor to perform the methods according to the embodiments of this disclosure.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the methods according to the embodiments of this disclosure.

In the embodiments of this disclosure, the first function network element, the second function network element, and the network exposure function device can use corresponding subscription rules to enable the second function network element to directly access the first function network element, so that data exchange is directly implemented between the first function network element and the second function network element, thereby improving the efficiency of information obtaining between the two network elements.

DESCRIPTION OF EMBODIMENTS

The following clearly and completely describes the technical solutions in the embodiments of the present invention with reference to the accompanying drawings in the embodiments of this disclosure.

Figure 1:
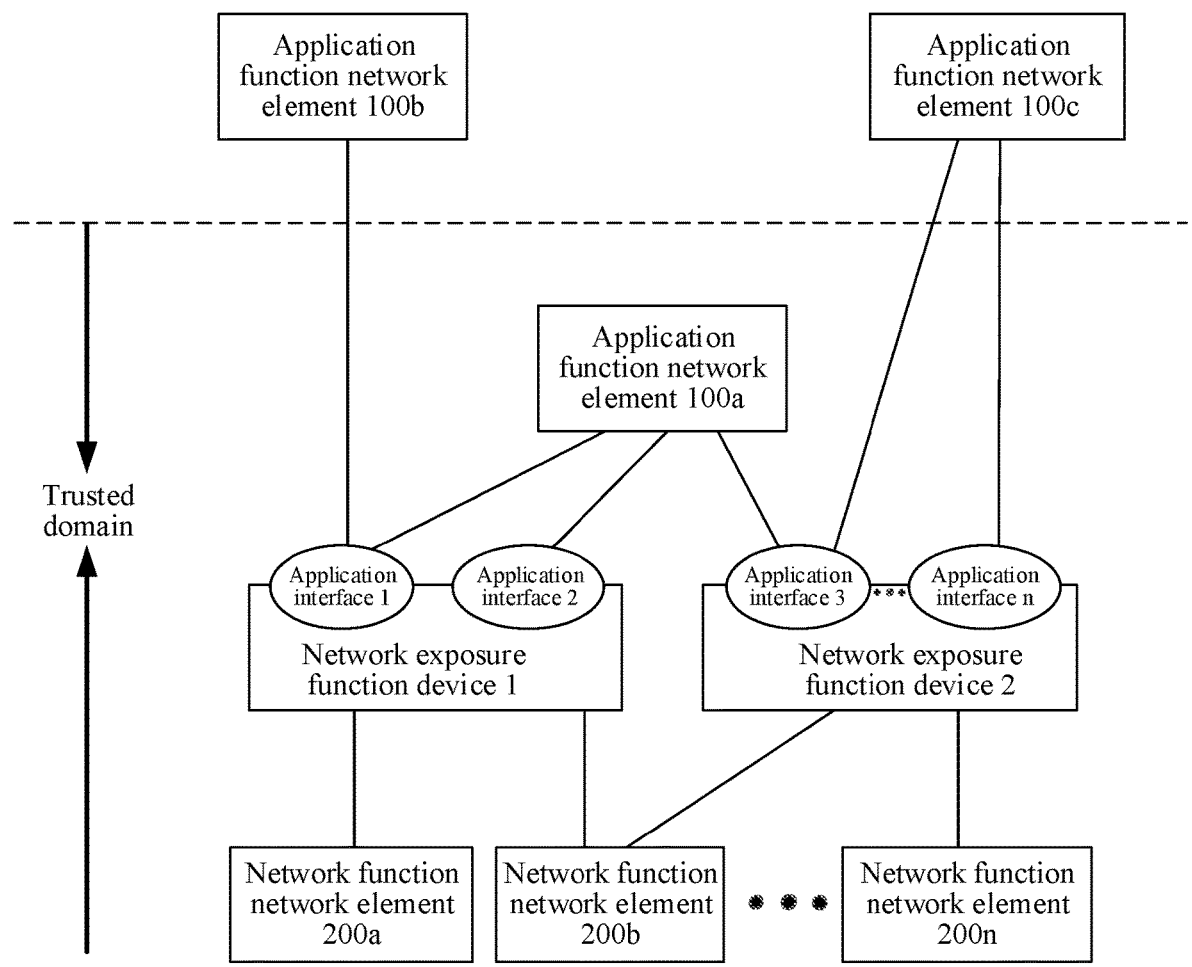
FIG. 1 is a schematic diagram of a network architecture of a communication system according to an embodiment of this disclosure.

FIG. 1 is a schematic diagram of a network architecture of a communication system according to an embodiment of this disclosure. The communication system may include, but is not limited to, a 5G communication system, which is not limited in this disclosure. The network architecture shown in FIG. 1 may include a network exposure function device cluster A, a first function network element cluster B located in an untrusted domain, and a second function network element cluster C located in a trusted domain.

The network exposure function device cluster A may include one or more network exposure function devices, and this disclosure does not limit the quantity of network exposure function devices. As shown in FIG. 1, the network exposure function device cluster A may include, for example, a network exposure function device 1 and a network exposure function device 2. In the network architecture, the network exposure function device 1 and the network exposure function device 2 may be collectively referred to as network exposure functions (NEFs).

The first function network element cluster B may include one or more function network elements (for example, application function network elements), and this disclosure does not limit the quantity of application function network elements in the first function network element cluster B. As shown in FIG. 1, the first function network element cluster B may include, for example, an application function network element 100a, an application function network element 100b, and an application function network element 100c. In this network architecture, the application function network element 100a, the application function network element 100b, and the application function network element 100c may be collectively referred to as application functions (AFs).

The second function network element cluster C may include one or more function network elements (for example, network function network elements) in the 5G core network, and this disclosure does not limit the quantity of network function network elements in the second function network element cluster C. As shown in FIG. 1, the second function network element cluster C may include, for example, a network function network element 200a, a network function network element 200b, . . . , and a network function network element 200n. In this network architecture, network function network elements 200a, network function network elements 200b, . . . , and the network function network element 200n may be collectively referred to as network functions (NFs), where the NF may include, but is not limited to, a PCF, an access and mobility management function (AMF), a session management function (SMF), and the like. In a broad sense, a user plane function (UPF) is also a network function.

In the 5G communication system, the NEFs are located between the 5G core network and external third-party application functions (there may be alternatively some internal AFs, that is, AFs deployed and trusted by operators). The NEFs may be used to manage network data that is open to the outside world. As shown in FIG. 1, all external applications need to pass the NEFs before accessing internal data of the 5G core network. The NEFs can provide corresponding security guarantees to ensure the security and topology isolation of external applications to the 3GPP network, and can further provide functions such as external application QoS customization capability exposure, mobility status event subscription, location information, and AF-affected routing.

In the 5G communication system, the AFs refer to various services at an application layer, which may be applications such as VoLTE AF (similar to 4G VoLTE AS) in operators, or AFs (for example, AFs deployed on edge servers such as video servers, game servers, and in-vehicle servers) of third parties (that is, third-party service providers). If an AF is an AF deployed and trusted by an operator (for example, the application function network element 100a shown in FIG. 1), the AF may be deployed in the same trusted domain with other NFs, so that the AF can directly interact with and access other NFs without passing the NEFs. For example, the application function network element 100a may interact with and access a policy control function (PCF), to directly invoke a service provided by the PCF for being responsible for policy control.

If the AF is an AF of a third party (that is, a third-party service provider), the AF is not deployed in the trusted domain. In this case, third-party AFs (for example, the application function network element 100b and the application function network element 100c shown in FIG. 1) need to access other NFs through the NEFs. That is, the external application function network element 100b and application function network element 100c cannot directly exchange data with the NFs.

An embodiment of this application provides a data information obtaining method based on the network architecture of FIG. 1. The method can resolve the problem that data cannot be directly exchanged between the AFs (for example, network elements such as the application function network element 100b and the application function network element 100c) outside the trusted domain and the NFs in the trusted domain.

Figure 2:
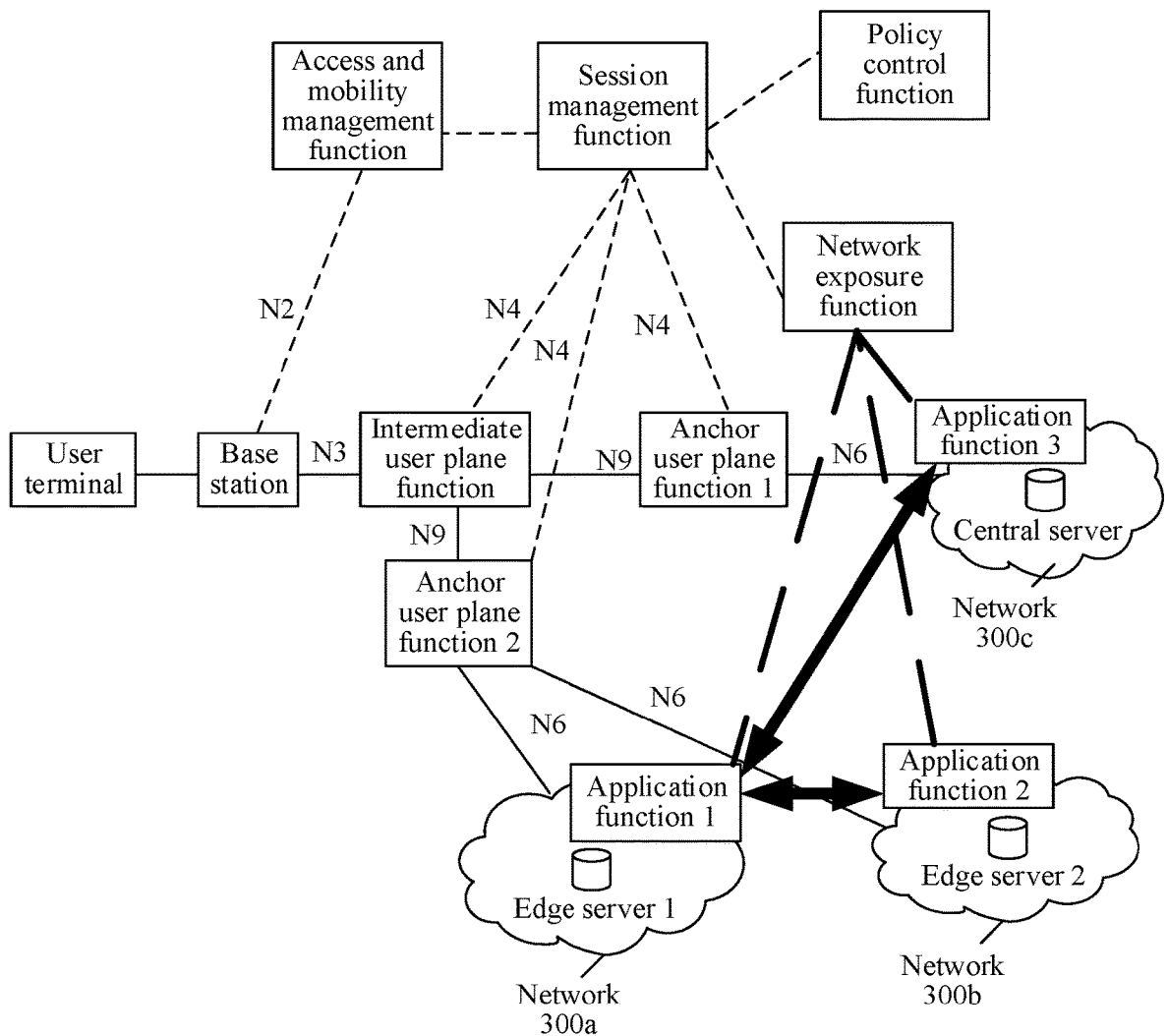
FIG. 2 is a schematic diagram of a network architecture based on the 5G communication system according to an embodiment of this disclosure.

FIG. 2 is a schematic diagram of a network architecture based on the 5G communication system according to an embodiment of this disclosure. The network architecture shown in FIG. 2 is implemented on the network architecture shown in FIG. 1 above. A 3GPP system (that is, a 5G communication system) may include at least a 5G access network, a 5G core network, and a user terminal. The user terminal (UE) shown in FIG. 2 may be connected to the 5G core network through a base station shown in FIG. 2 (for example, a 5G base station).

For example, before performing service communication, the UE may obtain an IP address configured by the 5G core network. For example, an IP address configured for the UE by the SMF in the 5G core network may be obtained. As shown in FIG. 2, the SMF may carry the IP address assigned to the UE in a PDU session setup accept (NAS) message transmitted to the UE, where the message may be transparently transmitted by the AMF to the base station, and then transparently transmitted by the base station to the UE. In the 3GPP network shown in FIG. 2, the UE may access a plurality of data networks in parallel based on one PDU session, for example, may access a network 300a, a network 300b, and a network 300c shown in FIG. 2.

A user plane function (UPF) may include an intermediate user plane function (for example, I-UPF) for implementing a service offload function, an anchor user plane function 1 (for example, PSA-UPF1) for interacting with a data network of a central server, and an anchor user plane function 2 (for example, PSA-UPF2) for interacting with a multi-access edge computing (MEC) network of an edge server. The UPF is further used for implementing user packet routing and forwarding, data exchange with an external data network (DN), user plane QoS processing, flow control rule implementation (for example, gate control, redirection, and traffic diversion), and the like.

A DN may be, for example, an operator service, or an Internet or third-party service.

The MEC network may include, but is not limited to, the network 300a and the network 300b shown in FIG. 2. In this embodiment of this disclosure, edge servers 1 in the network 300a may be collectively referred to as a first device, an application function 1 (AF1) shown in FIG. 2 may be an application function entity in the first device, and the AF1 may be deployed on the first device (for example, on the edge server 1 located within a MEC platform 1). To be easily distinguished from the edge server 1, in this embodiment of this disclosure, edge servers 2 in the network 300b may be collectively referred to as a second device, an application function 2 (AF2) shown in FIG. 2 may be an application function entity in the second device, and the AF2 may be deployed on the second device (for example, on the edge server 2 located within a MEC platform 2). An application function 3 (AF3) shown in FIG. 2 may be located in the data network of the central server. In this embodiment of this disclosure, the MEC platform 1 and the MEC platform 2 may each include at least one edge server, and the quantity of the edge servers included is not limited herein.

In the 3GPP network architecture shown in FIG. 2, the AF1 is located in the MEC platform 1 and may obtain low-delay network capability exposure information. As shown in FIG. 2, after the service offload is performed through the I-UPF (that is, the intermediate user plane function), the PSA-UPF2 (that is, the anchor user plane function 2) may be allowed to transmit user plane data from an N6 interface to the edge server 1 located in the MEC platform 1 through a routing protocol or a tunnel. If the AF1 in the MEC platform 1 is an entity of another edge server located in the network 300a, the AF1 may interact with the edge servers (for example, the edge server 1) deployed in the MEC platform 1, to transmit the capability exposure information of network exposure to the edge server 1. The AF1 may be alternatively integrated and deployed on the edge server 1, so that the edge server 1 has the capability exposure information of the AF1. The specific deployment manner of the AF1 is not limited herein.

Traffic orientation in the MEC platform refers to a capability of the MEC system to route traffic to a target application in a distributed cloud. For example, in 5G integration deployment, the UPF plays a central role in directing traffic to required applications and network functions. In addition to the UPF, 3GPP further specifies some related procedures to support flexible and efficient routing of traffic to applications. One process is the effect of an application function (for example, the AF1) on traffic routing, which allows the AF1 to effect the selection and re-selection of local UPFs and request service configuration rules to allow traffic offload and transfer to the data network (for example, the network 200*a* shown in FIG. 2).

For example, in a cloud data analysis scenario (that is, a service scenario that requires big data analysis), the AF1 may collect a large amount of data from the UE (for example, the data may be mobile phone video information, or sensor information (for example, AR sensor information or VR sensor information)), and process and analyze the collected data, so that useful data information can be extracted before the data is transmitted to the central server, thereby aggregating some new services for operators or third-party providers. The AF1 herein may run in a single location (that is, on a single host (for example, the edge server 1 shown in FIG. 2)), or distributed in a specific area (for example, campus coverage) or even across the entire network. The specific deployment manner and location thereof are not limited. It may be understood that when the AF1 extracts useful data information from a large amount of data to provide service events, the application function 3 (AF3) or the application function 2 (AF2) shown in FIG. 2 is allowed to directly obtain the capability exposure information of the AF1.

The AF3 located in the network 300*c* or the AF2 located in the network 300*b* may obtain the capability exposure information of the AF1 located in the network 300*a* through any one of the following solutions (for example, a first solution, a second solution, or a third solution). This embodiment of this disclosure does not limit the solution for directly obtaining the capability exposure information of the AF1 (that is, the first function network element).

For ease of understanding, the second function network element AF2 is taken as an example to describe the specific process of directly obtaining the capability exposure information of the AF1 from the network 300*a* by the AF2 through the foregoing solution.

A data exchange rule corresponding to the first solution may be a first data exchange rule. For example, the network exposure function shown in FIG. 2 (that is, the foregoing NEF) may perform authentication on a capability invocation request transmitted by a function network element (for example, the AF2) located on the MEC platform 2 according to a specific configuration policy (for example, a subscription rule between the AF2 and the NEF). If the authentication succeeds, capability invocation response information may be returned to the AF2, so that the AF2 may directly transmit a capability invocation subscription request to the AF that provides the capability (for example, the foregoing AF1) based on the received capability invocation response information. When the AF1 determines to receive the capability invocation subscription request, capability invocation subscription response information for the capability invocation subscription request may be directly returned to the AF2. Thereafter, when detecting occurrence of an event corresponding to an event type subscribed with the AF2, the AF1 may quickly and directly transmit event response information of the event to the AF2.

For example, the capability invocation response information may carry the following authentication response parameter information; and indication information of receiving the capability invocation request. Further, the authentication response parameter information may further include identification information (for example, identification information of the AF1 described above) of an AF that is determined by the NEF and capable of providing services to the AF2, and/or Internet Protocol (IP) address information of the AF1, and/or an endpoint address of the AF1, and the like. The authentication response parameter information may further include access token information or access key information configured by the NEF for the AF2 to access the AF1. The specific content of the authentication response parameter information returned by the NEF and received by the AF2 is not limited.

A data exchange rule corresponding to the second solution may be a second data exchange rule, and the second data exchange rule specifically means that in this disclosure, the capability invocation request of the AF2 may be alternatively forwarded to the AF1 through the NEF. For example, a function network element (for example, the AF1) located on the MEC platform 1 may receive a corresponding request (for example, a capability invocation request for invoking the capability exposure information of the AF1) transmitted by the AF2 through the NEF, so that the AF1 performs authentication on the capability invocation request relayed by the NEF, to determine whether to receive the capability invocation request transmitted by the AF2 through the NEF. For example, when the AF1 determines to receive the capability invocation request, the subscription processing for a target event type requested by the AF2 in the AF1 may be completed, and when the target event type is successfully subscribed, the request response parameter information that needs to be returned to the AF2 is relayed through the NEF. Thereafter, when detecting occurrence of an event corresponding to a subscription event type (that is, a target event type subscribed), the AF1 can quickly and directly transmit event response information of the event to the AF2.

The foregoing subscription event type may be an associated target event type determined by the AF1 in request event types (for example, one or more event types) transmitted by the AF2, that is, the target event type is an event type supported by the AF1. In this embodiment of this disclosure, one or more event types transmitted by the AF2 may be collectively referred to as a request event type. The quantity of request event types is not limited herein.

The foregoing request response parameter information may further include prompt information for indicating that the AF1 receives a capability invocation request, the foregoing subscription event type (that is, the subscription event type may be a target event type with a subscription state), the identification information of the first function network element (for example, the AF1), and/or IP address information of the first function network element, and/or endpoint address information of the first function network element.

A data exchange rule corresponding to the third solution may be a third data exchange rule, and the third data exchange rule specifically means that the NEF may actively determine, according to the actual service requirements (for example, according to policy information of the network operator or network topology information), to use which of the foregoing capability invocation authentication manners (that is, actively determine whether to use the foregoing first solution or second solution). For example, a function network element closest to the function network element (for example, the AF2) that initiates the capability invocation request may be determined according to the policy information of the network operator or the network topology information. If the function network element (for example, the AF1) closest to the AF2 can support an event type requested by the AF2, the NEF may directly forward the capability invocation request to the AF1 by using the second data exchange rule corresponding to the second solution above, so that the AF1 can perform authentication on the capability invocation request. If the policy information of the network operator requires that the NEF needs to authenticate the capability invocation request, the NEF may adopt the first data exchange rule corresponding to the foregoing first solution, and the NEF performs the authentication on the capability invocation request based on the foregoing specific configuration policy, to determine which NF or which AF is used to provide the capability invocation request service for the AF2.

It may be understood that, as shown in FIG. 2 above, in this embodiment of this application, the AF (for example, the second application function 2) may use the NEF (and the Npcf_BDTPolicyControl_Create service operation) to contact the PCF (that is, the policy control function shown in FIG. 2), to request a time window (for example, to request valid time period information) and related conditions (for example, delay requirements, maximum invocation count information, and event response time interval information) for subsequent background data transmission.

The edge servers deployed on the MEC platform 1 can be effectively used to support computing-intensive applications such as applications that require graphics rendering (high-speed browsers, augmented reality (AR), virtual reality (VR), 3D games, and the like), applications that require extensive data preprocessing (sensor data cleaning, video analysis, and the like), and applications that need to provide value-added services (language translation, log analysis, and the like). The AF1 deployed on the MEC platform can provide these edge servers with information about network capability exposure. As the evolution of cloud computing, edge computing migrates applications from centralized data centers to edge networks, which can be closer to consumers and data sources.

Figure 3:
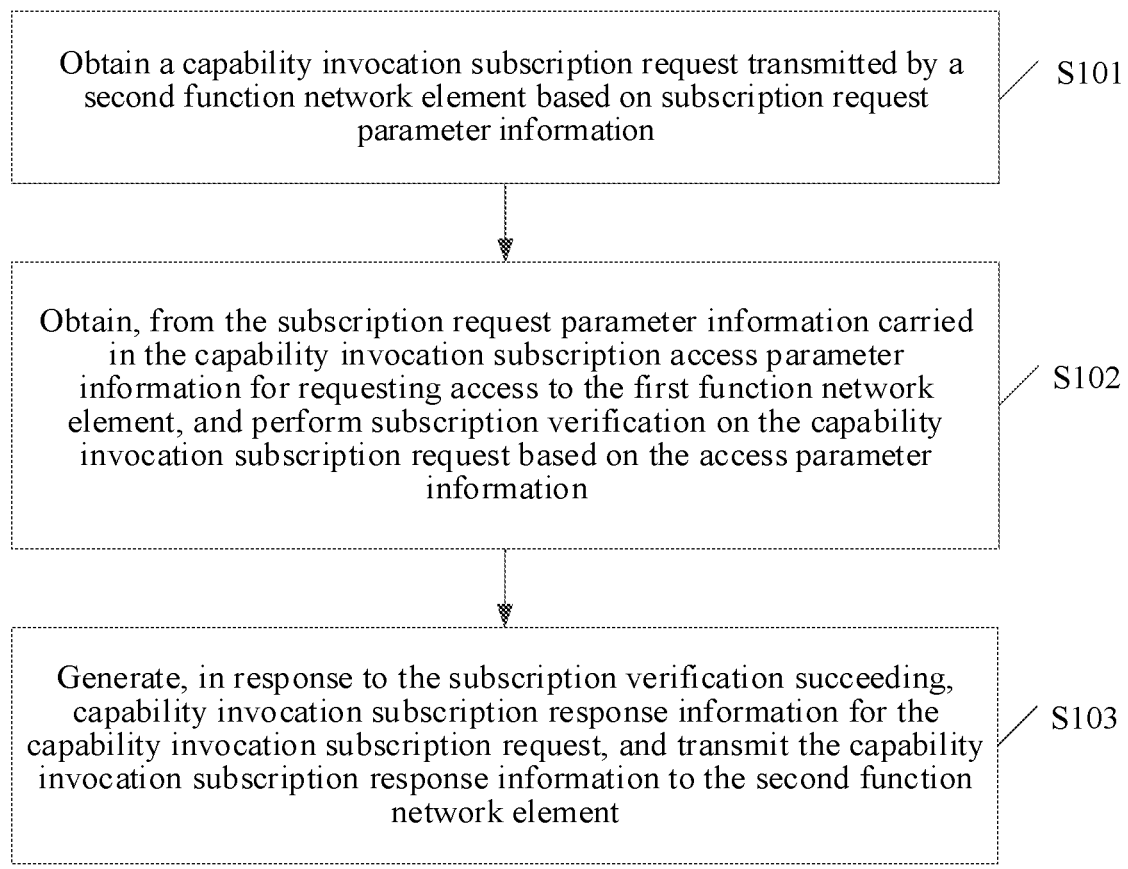
FIG. 3 is a schematic flowchart of obtaining data information according to an embodiment of this disclosure.

FIG. 3 is a schematic flowchart of obtaining data information according to an embodiment of this disclosure. The method may be performed by a computer device, where the computer device may be a first device. For example, the first device may be the edge server 1 in the embodiment shown in FIG. 2 above. It may be understood that a first function network element runs in the first device, and the first function network element may be the application function 1 in the embodiment shown in FIG. 2, that is, the AF1. The method for obtaining data information may include at least the following steps S101 to S103:

Step S101: Obtain a capability invocation subscription request transmitted by a second function network element based on subscription request parameter information, the subscription request parameter information being determined by the second function network element according to received authentication response parameter information, the authentication response parameter information being obtained after a network exposure function device performs authentication on a capability invocation request, and the capability invocation request being transmitted by the second function network element.

The first function network element may be a first application function entity, and the first application function entity may be an application function deployed on the first platform (for example, the application function 1 in the embodiment shown in FIG. 2 above). The second function network element may be a second application function entity, and the second application function entity may be an application function deployed on the second platform (for example, the application function 2 in the embodiment shown in FIG. 2 above).

The first platform may be different from the second platform, that is, data exchange between network elements can be implemented on two cross-platforms through the embodiments of this disclosure. The first platform and the second platform may be alternatively the same platform, that is, data exchange between network elements can be implemented on the same platform through the embodiments of this disclosure.

Figure 4:
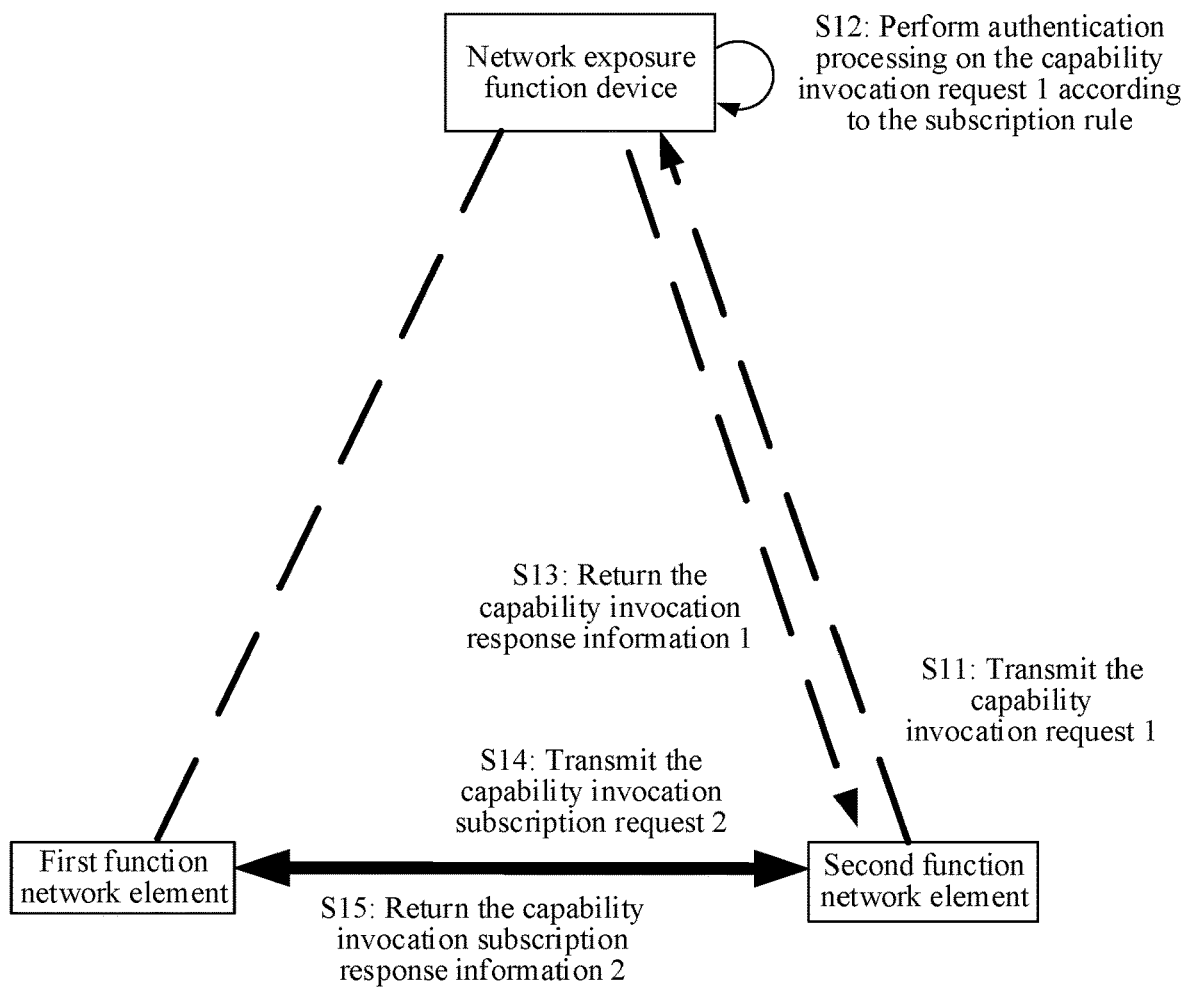
FIG. 4 is a schematic diagram of a scenario of data exchange according to an embodiment of this disclosure.

For ease of understanding, FIG. 4 is a schematic diagram of a scenario of data exchange according to an embodiment of this disclosure. A network exposure function device in FIG. 4 may be the NEF in the embodiment shown in FIG. 2 above. A first function network element in FIG. 4 may be the AF1 in the embodiment shown in FIG. 2 above. A second function network element in FIG. 4 may be the AF2 in the embodiment shown in FIG. 2 above. In the 5G communication system in the embodiment shown in FIG. 2 above, both the AF1 and the AF2 can contact the PCF (that is, the policy control function shown in FIG. 2 above) through the NEF (and the Npcf_BDTPolicyControl_Create service operation), to request the corresponding time window and related conditions for subsequent background data transmission.

As shown in FIG. 4, when the AF2 needs to invoke a capability (for example, a specific service) from the AF1, the AF2 may pre-perform step S11 shown in FIG. 4 to transmit a capability invocation request 1 to the NEF. There are subscription rules between the AF2 and the NEF that meet the requirements of 5G communication and the requirements of the network operator, and there are also subscription rules between the AF1 and the NEF that meet the requirements of 5G communication and the requirements of the network operator. For ease of understanding, in this embodiment of this disclosure, the subscription rules between NEF and the AF2 may be collectively referred to as first subscription rules, and the subscription rules between NEF and the AF1 may be collectively referred to as second subscription rules. Based on this, the authentication response parameter information may be obtained after a network exposure function device performs authentication on a capability invocation request based on the first subscription rules; and the capability invocation request may be transmitted by the second function network element based on the first subscription rules.

When the NEF receives the capability invocation request (that is, the capability invocation request 1 shown in FIG. 4) from the AF2, the NEF (that is, the network exposure function device) may perform step S12 shown in FIG. 4, to perform authentication on the capability invocation request 1 according to the corresponding subscription rules (that is, the foregoing first subscription rules). The capability invocation request 1 may carry request parameter data information requested by the AF2. For example, the request parameter data information may further include identification information of the AF2, authentication information of the AF2, and information such as one or more event types requested by the AF2. In this embodiment of this disclosure, the one or more event types requested by the AF2 are collectively referred to as request event types, and the request event types may include target event types associated with the AF1, where the AF1 may be a function network element capable of providing services for the AF2. In this embodiment of this disclosure, when the NEF receives the foregoing capability invocation request 1, step S12 shown in FIG. 4 may be performed, to directly perform authentication on the received capability invocation request according to the specific subscription rules (for example, the first subscription rules that meet the requirements of 5G communication and the requirements of the network operator).

The request parameter data information may further include: a delay index (that is, a delay requirement) for responding to an event, an effective duration (that is, effective time period information) for capability invocation, an invocation count threshold (that is, maximum invocation count information) for capability invocation, a time interval (that is, time interval information for responding to an event) for responding to an event, and the like. The specific parameters of the request parameter data information are not limited herein.

The delay index may include, but is not limited to, an identifier used for indicating that the network exposure function device determines that the first application function entity (for example, the AF1) can meet the request of the second application function entity (for example, the AF2). The delay index may be further used for indicating that the AF1 provides the AF2 with a low-delay capability invocation service. The specific function of the delay index is not limited herein.

As shown in FIG. 4, the detailed process of performing authentication on the capability invocation request 1 by the NEF may include at least an authentication process and an authorization process. The authentication process means that after the NEF obtains the capability invocation request 1 transmitted by the AF2, the authentication information of the AF2 (for example, certificate information of the AF2) is obtained from the capability invocation request 1, and the validity of the obtained authentication information is then verified. The authorization process specifically means that after determining that the AF2 passes the authentication, the NEF may further perform authorization processing on the capability invocation request 1 transmitted by the AF2, for example, may determine that the capability invocation request 1 is a valid request.

After obtaining the authentication information (for example, the certificate information of the AF2) transmitted by the AF2, the NEF may search for subscription verification information (for example, subscription certificate information) for verifying the certificate information according to the identification information of the AF2, and then verify, according to the found subscription verification information (for example, the subscription certificate information) of the AF2, the authentication information (for example, the certificate information of the AF2) transmitted by the AF2 to obtain an authentication result. If the authentication result indicates that the subscription verification information is consistent with the authentication information, it may be determined that the authentication information transmitted by the AF2 (for example, the certificate information of the AF2) is valid authentication information.

Further, after the NEF determines that the authentication information of the AF2 passes the authentication, it may be determined that the AF2 used to transmit the request parameter data information is valid, and it may be further determined that the capability invocation request 1 transmitted by the AF2 is a valid request. Correspondingly, the NEF may determine that the request parameter data information transmitted by the valid AF2 is also valid parameter information according to the foregoing first subscription rules. This disclosure does not limit the authentication process of the NEF.

When the NEF performs authentication (for example, authentication and authorization) on the capability invocation request according to the foregoing first subscription rules, the NEF may further determine an AF or NF that can provide services for the AF2. For example, the NEF may check which AFs or NFs can provide the capability invocation request service for the AF2 (that is, the second function network element shown in FIG. 4) in an obtained subscription list. Specifically, the NEF may check in the subscription list whether the AF1 (that is, the first function network element shown in FIG. 4) can provide services for the event type indicated by the capability invocation request 1 transmitted by the AF2. The NEF may further determine identification information of an AF (for example, the foregoing AF1) that provides the capability for the AF2 according to the delay index (that is, the delay requirement) parsed from the request parameter data information, the policy information of the network operator, the network topology information, or the like.

For ease of understanding, in this embodiment of this disclosure, an example is taken in which the first data exchange rule used is the foregoing direct interaction manner. After obtaining the foregoing capability invocation request 1, the NEF further needs to determine other parameters in the request parameter data information (for example, the foregoing one or more event types) to determine whether the event type of the AF1 conforms to the event type requested by the AF2. If the two event types are consistent, an event type the same as the event type of the AF1 among the one or more event types requested by the AF2 may be used as a target event type. For ease of understanding, one event type requested by the AF2 is taken as an example. Based on the identification information of the AF2 (that is, the first identification information), the authentication information of the AF2, and the target event type, the NEF performs authentication on the capability invocation request to determine whether the target event type requested by the AF2 is the same as the event type indicated by the AF1. Further, capability invocation response information for the capability invocation request 1 (for example, capability invocation response information 1 shown in FIG. 4) may be generated. In this case, the NEF may perform step S13 to return the capability invocation response information 1 to the second function network element (for example, the AF2) shown in FIG. 4, so that the second function network element shown in FIG. 4 may perform step S14 shown in FIG. 4. That is, the second function network element (for example, the AF2) may transmit a capability invocation subscription request (that is, a capability invocation subscription request 2 shown in FIG. 4) to the first function network element (for example, the AF1).

The capability invocation response information 1 received by the second function network element (for example, the AF2) may carry authentication response parameter information, where the authentication response parameter information may include at least authentication success indication information. The authentication success indication information is obtained after the network exposure function device determines that the verification of the capability invocation request succeeds after the authentication is successfully completed. In this embodiment of this disclosure, the authentication success indication information may be alternatively collectively referred to as prompt information for indicating that the NEF passes the authentication of the capability invocation request. It may be understood that if the NEF passes the authentication of the capability invocation request 1, the identification information of the AF1, and/or the IP address information of the AF1, and/or the endpoint address information of the first function network element, and the access parameter information may be further returned to the AF2. The access parameter information may be the access token information or target key information configured by the NEF for the AF2 to access the AF1.

As can be seen, the authentication response parameter information of the capability invocation response information 1 returned by the NEF when the authentication succeeds may include at least: prompt information for indicating receiving the capability invocation request, second identification information of the first function network element, IP address information of the first function network element, endpoint address information of the first function network element, or the access parameter information; and the access parameter information is access token information or target key information configured by the network exposure function device for the second function network element and used for accessing the first function network element.

When the NEF does not pass the authentication, the capability invocation response parameter information 1 herein may further carry another prompt information for indicating rejection of the capability invocation request. For example, if the NEF does not pass the authenticate the capability invocation request, a reason value for rejecting to accept the capability invocation request may be further returned. For example, if the NEF determines that the AF2 cannot request a specific event type, a rejection reason value (for example, 1) for rejecting the foregoing capability invocation request 1 may be returned. The rejection reason values for rejecting the capability invocation request 1 are not listed herein.

Step S102: Obtain, from the subscription request parameter information carried in the capability invocation subscription request, access parameter information for requesting access to the first function network element, and perform subscription verification on the capability invocation subscription request based on the access parameter information.

When receiving the capability invocation subscription request transmitted by the second function network element (that is, the capability invocation subscription request 2 shown in FIG. 4 above), the first function network element may further obtain the carried subscription request parameter information from the capability invocation request. The subscription request parameter information may include: the identification information of the second function network element, the target event type associated with the first function network element that is determined by the NEF, the access parameter information configured by the NEF, a delay index for responding to an event, an effective duration for capability invocation, an invocation count threshold for capability invocation, and a time interval for responding to an event.

After obtaining the subscription request parameter information, the first function network element may further extract the foregoing access parameter information (for example, the access token information or the target key information for requesting access to the first function network element) from the subscription request parameter information. In this case, the first function network element may perform subscription verification on the capability invocation subscription request based on the access parameter information, and then perform the following step S103 when the subscription verification succeeds.

As shown in FIG. 4, when obtaining the capability invocation subscription request 2, the first function network element may extract the access token information or the target key information from the capability invocation subscription request 2, and then perform subscription verification on the access token information or the target key information. If the verification succeeds (that is, the subscription verification succeeds), the capability invocation subscription request 2 can be received to perform step S14 shown in FIG. 4 above. That is, the first function network element may return the capability invocation subscription response information 2 for the capability invocation subscription request 2 to the second function network element, to notify the second function network element that the first function network element has currently completed the subscription for the target event type. It may be understood that the capability invocation subscription response information 2 herein may be the capability invocation subscription response information in the following step S103.

When the subscription verification succeeds, the capability invocation subscription response information 2 may include indication information for indicating reception of the capability invocation subscription request 2. When the subscription verification fails, the capability invocation subscription response information 2 may further include another indication information for indicating rejection to receive the capability invocation subscription request 2, that is, the another indication information for indicating rejection to receive the capability invocation subscription request 2 may carry a corresponding rejection reason value. For example, the rejection reason value herein may be, for example, a rejection reason value 2, which may be used for indicating that the AF1 counts that the event corresponding to the event type invoked by the AF2 reaches maximum invocation count information within the effective duration (that is, reaches the foregoing invocation count threshold authorized for capability invocation).

Step S103: Generate, when the subscription verification succeeds, capability invocation subscription response information for the capability invocation subscription request, and transmit the capability invocation subscription response information to the second function network element, where the capability invocation subscription response information may be used for indicating that the second function network element accesses the first function network element. In addition, when the subscription verification succeeds, the first function network element may determine the target event type requesting a subscription transmitted by the AF2 as the subscription event type that has been subscribed, and may further store the subscription event type in the AF1. In this way, when detecting the occurrence of the event corresponding to the subscription event type (that is, subscribed event), the AF1 may directly return the event response information of the subscribed event to the second function network element, thereby helping the second function network element to improve the efficiency of obtaining information.

As can be seen, after the second function network element successfully subscribes to the target event of the first function network element, the first function network element may directly return the event response information for the subscribed event to the second function network element when detecting occurrence of the event (that is, the subscribed event corresponding to the foregoing target event type) corresponding to the currently subscribed target event type (that is, the subscription event type). For example, the AF1 (that is, the first function network element) may return the event response information to the AF2 (that is, the second function network element) within the foregoing time interval for responding to the subscribed event.

In this embodiment of this disclosure, the first function network element located on the first platform may receive the capability invocation subscription request transmitted by the second function network element located on the second platform. The capability invocation subscription request is generated by the second function network element based on subscription request parameter information; the subscription request parameter information being determined by the second function network element according to received authentication response parameter information; the authentication response parameter information is obtained after a network exposure function device performs authentication on a capability invocation request based on the first subscription rules; and the capability invocation request is pre-transmitted by the second function network element based on a first subscription rule with the network exposure function device. As can be seen, before the second function network element transmits the capability invocation subscription request to the first function network element, the second function network element may pre-transmit the capability invocation request to the network exposure function device, so that the network exposure function device can directly perform authentication on the received capability invocation request, and then return the authentication response parameter information to the second function network element when the authentication succeeds. Further, the first function network element may obtain, from the subscription request parameter information carried in the capability invocation subscription request, access parameter information for requesting access to the first function network element, and then perform subscription verification on the capability invocation subscription request based on the access parameter information (for example, the foregoing access token information). The first function network element may generate, when the subscription verification succeeds, capability invocation subscription response information for the capability invocation subscription request, and then return the capability invocation subscription response information to the second function network element, where the capability invocation subscription response information may be used for indicating that the second function network element accesses the first function network element. In this case, data exchange can be directly implemented between the first function network element and the second function network element, thereby improving the efficiency of information obtaining between the network elements on the two platforms.

Figure 5:
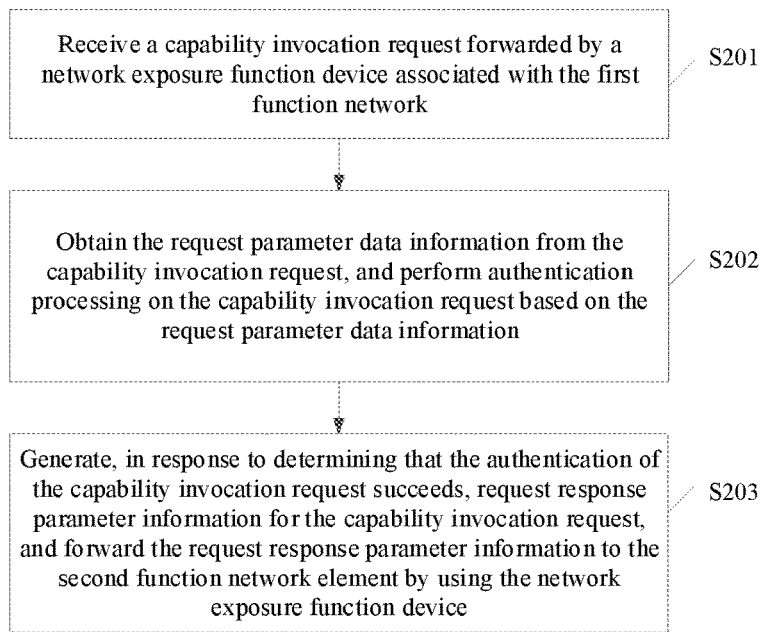
FIG. 5 is a schematic flowchart of obtaining data information according to an embodiment of this disclosure.

FIG. 5 is a schematic flowchart of obtaining data information according to an embodiment of this disclosure. The method may be performed by a computer device, where the computer device may be a first device. The first device is the edge server 1 in the embodiment shown in FIG. 2 above. It may be understood that a first function network element runs in the first device, and the first function network element may be the application function 1 in the embodiment shown in FIG. 2, that is, the application function 1 may be the AF1. It may be understood that the first function network element may be used to perform the method in the embodiment shown in FIG. 3, and the first function network element may further perform the following steps S201 to S203:

Step S201: Receive a capability invocation request forwarded by a network exposure function device associated with the first function network element.

The capability invocation request is transmitted by a second function network element associated with the network exposure function device, and the capability invocation request may carry request parameter data information. For example, the request parameter data information may include at least authentication information of the second function network element. In this embodiment of this disclosure, a first subscription rule that meets the requirements of the foregoing operator may exist between the network exposure function device and the second function network element, and a second subscription rule that meets the requirements of the foregoing operator may exist between the first function network element and the network exposure function device.

In this embodiment of this disclosure, when receiving the capability invocation request transmitted from the second function network element, the network exposure function device may directly use the second data exchange rule to perform the second solution. For example, the NEF may directly forward the received capability invocation request to the first function network element based on a configuration policy (for example, a configuration policy 2). Specifically, the NEF may receive the capability invocation request according to the first subscription rule with the second function network element, determine the first function network element serving the request, and then directly forward the capability invocation request to the first function network element.

In some achievable implementations, the NEF may alternatively determine to directly forward the capability invocation request transmitted by the AF2 to the AF1 according to the policy information of the operator or the network topology information, so that the AF1 perform authentication on the obtained capability invocation request.

The NEF may directly perform authentication on the capability invocation request transmitted by the AF2 in the NEF according to the requirements of the operator. For example, the NEF may perform the foregoing first solution according to specific information (for example, the foregoing configuration policy 1). That is, the NEF may perform authentication on the received capability invocation request according to the foregoing first subscription rule. For a specific implementation of performing authentication on the capability invocation request by the NEF, reference may be made to the description of the obtained capability invocation response information 1 in the embodiment shown in FIG. 3.

Figure 6:
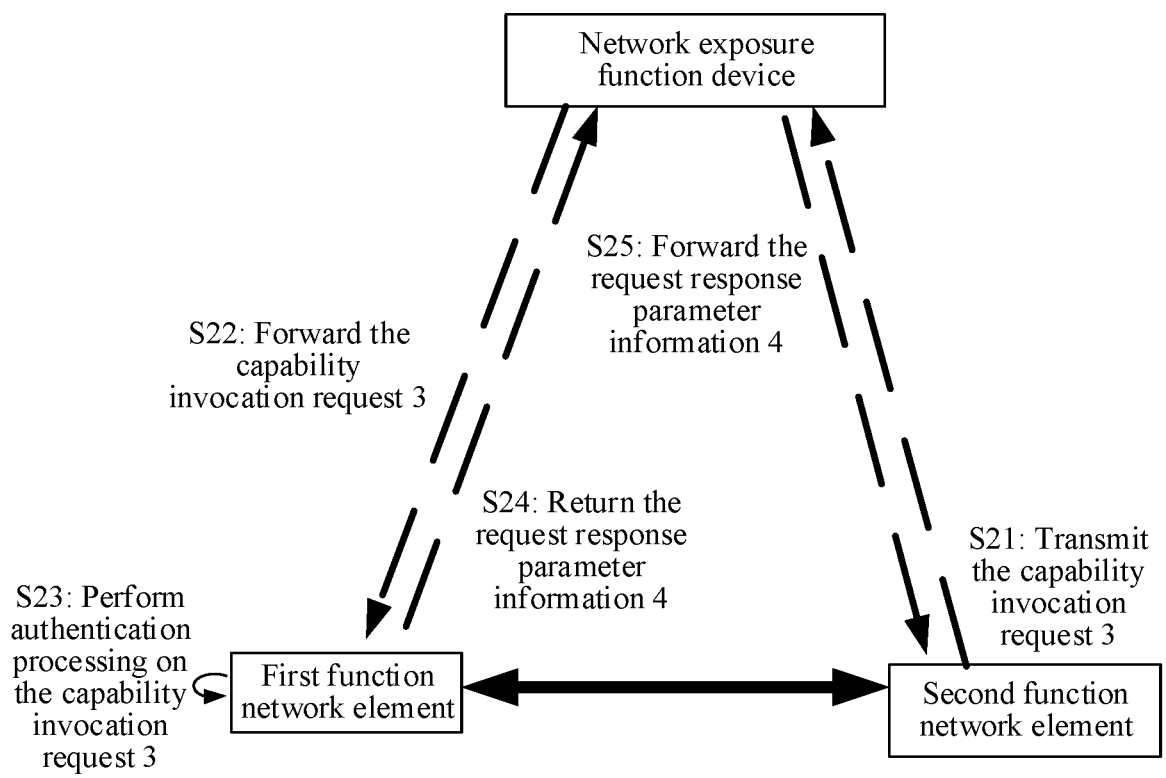
FIG. 6 is a schematic diagram of data exchange between network elements implemented via a network exposure function device according to an embodiment of this disclosure.

For ease of understanding, FIG. 6 is a schematic diagram of a scenario of data exchange between network elements implemented through transfer of a network exposure function device according to an embodiment of this disclosure. As shown in FIG. 6, the first function network element may be deployed on the first platform, and the first platform may be the foregoing MEC platform 1. The second function network element may be deployed on the second platform; the second platform may be the foregoing MEC platform 2. The first platform herein may be different from the second platform. For example, one of the platforms may be an operator platform, and the other platform may be a platform (referred to as a third-party platform for short) of a third-party service provider. The second function network element and the first function network element herein may be alternatively deployed on the same platform, for example, both deployed on a third-party platform in a specific geographic region.

The capability invocation request transmitted by the second function network element (for example, a capability invocation request 3 shown in FIG. 6) may carry request parameter data information. The request parameter data information may further include: identification information of the second function network element (for example, the second function network element may be the second application function entity deployed in the foregoing second device), a target event type, and authentication information of the second function network element. In some achievable implementations, the request parameter data information may further include: a delay index for responding to an event, an effective duration for capability invocation, an invocation count threshold for capability invocation, and a time interval for responding to an event.

As shown in FIG. 6, after the second function network element (for example, AF2) performs step S21 shown in FIG. 6, the network exposure function device (for example, the NEF) may receive the capability invocation request 3 and determine a function network element matching the target event type requested in the capability invocation request 3. For example, the NEF determines that the function network element that can provide services for the second function network element is the first function network element shown in FIG. 6. The delay index may be used for indicating that the network exposure function device determines the first application function entity matching the capability invocation request transmitted by the second application function entity. It may be understood that, after receiving the capability invocation request 3, the network exposure function device may further perform step S22 shown in FIG. 6 according to the foregoing second solution, that is, the capability invocation request 3 may be directly forwarded to the first function network element shown in FIG. 6.

As shown in FIG. 6, after receiving the capability invocation request 3 forwarded by the network exposure function device, the first function network element (for example, the AF1) may further perform step S23 shown in FIG. 6, where step S23 may be the following step S202 in this embodiment of this disclosure.

Step S202: Obtain the request parameter data information from the capability invocation request, and perform authentication on the capability invocation request based on the request parameter data information.

Specifically, after performing the foregoing step S201, the first function network element may obtain authentication information from the received capability invocation request, for example, the authentication information herein may be the certificate information of the foregoing AF2. In this way, the first function network element may search for and obtain the subscription verification information (for example, the subscription certificate information of the AF2) of the second function network element according to the identification information of the second function network element. The obtaining source of the subscription verification information (for example, the subscription certificate information of the AF2) is not limited herein. After finding the subscription verification information (for example, the subscription certificate information of the AF2) matching the identification information of the second function network element, the first function network element may authenticate the authentication information (that is, the certificate information of the AF2) according to the subscription verification information (for example, the subscription certificate information of the AF2). If the authentication succeeds, the capability invocation request 3 may be authorized. Specifically, the first function network element (for example, the AF1) may perform subscription processing on other parameter information (for example, the request event type transmitted by AF2, for example, the foregoing target event type) in the request parameter data information. For example, the AF1 may obtain an authentication success result when the subscription for the target event type is successfully completed. For example, the target event type requesting a subscription may be used as the foregoing subscription event type in the AF1, and the subscription event type may be stored in the AF1, so that the following step S203 may be performed subsequently.

The request parameter data information may carry identification information of the second function network element requesting a subscription, and authentication information of the second function network element.

The first function network element may be a first application function entity, and the first application function entity may be an application function deployed on the first platform (for example, the application function 1 in the embodiment shown in FIG. 2 above). The second function network element is a second application function entity, and the second application function entity may be an application function deployed on the second platform (for example, the application function 2 in the embodiment shown in FIG. 2 above).

The first platform may be different from the second platform, that is, data exchange between network elements can be implemented on two cross-platforms through the embodiments of this disclosure. As shown in FIG. 6, when the AF2 (that is, the second function network element) needs to invoke a capability (for example, a specific service) from the AF1 (that is, the first function network element), the AF2 (that is, the second function network element) may pre-perform step S21 shown in FIG. 6 to transmit the capability invocation request 3 shown in FIG. 6 to the NEF (that is, the network exposure function device) shown in FIG. 6. It may be understood that, there are subscription rules between the AF2 and the NEF that meet the requirements of 5G communication and the requirements of the network operator, and there are also subscription rules between the AF1 and the NEF that meet the requirements of 5G communication and the requirements of the network operator. For ease of understanding, in this embodiment of this disclosure, the subscription rules between NEF and the AF2 may be collectively referred to as first subscription rules, and the subscription rules between NEF and the AF1 may be collectively referred to as second subscription rules.

When the AF1 receives the capability invocation request (that is, the capability invocation request 3 shown in FIG. 6) from the NEF (that is, the network exposure function device), the AF1 may perform step S23 shown in FIG. 6, to perform authentication on the capability invocation request 3. The capability invocation request 3 may carry request parameter data information requested by the AF2. For example, the request parameter data information may further include the identification information of AF2 (that is, the first identification information), one or more event types that the AF2 needs to request, a delay index (that is, a delay requirement) for responding to an event, an effective duration (that is, effective time period information) for capability invocation, an invocation count threshold (that is, maximum invocation count information) for capability invocation, a time interval (that is, time interval information for responding to an event) for responding to an event, and the like.

The detailed process of performing authentication on the capability invocation request 3 by the AF1 may include at least an authentication process and an authorization process. The authentication process means that the AF1 may obtain the authentication information in the foregoing request parameter data information from the capability invocation request 3 after obtaining the capability invocation request 3 transmitted by the AF2 relayed by the NEF, where the authentication information may be the certificate information of the second function network element (for example, the AF2). In this case, the AF1 (that is, the first function network element) may authenticate the authentication information according to the obtained subscription verification information of the AF2 (for example, the subscription certificate information of the AF2), and then authorize the capability invocation request 3 after the authorization succeeds. For example, the AF1 may determine whether the invocation count threshold for capability invocation is proper. If the invocation count threshold for capability invocation is proper, the AF1 may determine that the request parameter data information transmitted by the valid AF2 is valid parameter information, and may further perform the subscription process in the AF1 in the following step S203, to perform subscription processing on the target event type requesting a subscription in the request parameter data information. In this case, the AF1 may check, in an obtained subscription list, whether the AF1 can provide services of the event type indicated in the capability invocation request 3 for the AF2. For example, the AF1 may check, with an effective duration, whether the AF1 can provide services of the target event type indicated in the capability invocation request 3 for the AF2. If the AF1 can provide the services, the target event type may be used as a subscription event type, the target event type subscribed by the AF2 may be saved (that is, the foregoing subscription event type may be saved), and whether the event corresponding to the target event type occurs may be detected. In other words, the AF1 may generate request response parameter information for the capability invocation request 3 when the authentication succeeds and it is determined that the AF1 can provide the AF2 with the services of the target event type requesting the subscription, and may further perform steps S24 and S25 shown in FIG. 6.

Step S203: Generate, when determining that the authentication of the capability invocation request succeeds, request response parameter information for the capability invocation request, and forward the request response parameter information to the second function network element by using the network exposure function device.

Specifically, the first function network element may determine, after determining that the authentication of the capability invocation request succeeds, that the currently received capability invocation request is a valid request, and may then generate a subscription instruction for the valid request. Further, the first function network element may determine the target event type as the subscription event type based on the subscription instruction, generate request response parameter information for the subscription event type, and further transmit the request response parameter information to the network exposure function device, so that the network exposure function device forwards the request response parameter information to the second function network element.

The first function network element may further determine a target subscription rule between the first function network element and the second function network element based on the subscription instruction, determine the target event type as a subscription event type based on the target subscription instruction, and generate request response parameter information for the subscription event type. Further, the first function network element may transmit the request response parameter information to the network exposure function device based on a second subscription rule, so that the network exposure function device forwards the request response parameter information to the second function network element based on a first subscription rule.

The request response parameter information may be used for indicating that the second function network element accesses the first function network element. The request response parameter information (for example, the request response parameter information 4 shown in FIG. 6) may further include prompt information for indicating that a capability invocation request (for example, the foregoing capability invocation request 3) is received, the foregoing subscription event type (that is, the subscribed target event type), the identification information of the first function network element (for example, the AF1), and/or IP address information of the first function network element, and/or endpoint address information of the first function network element. In this embodiment of this disclosure, the subscribed target event type may be used as the foregoing subscription event type. In this case, the AF1 may return the request response parameter information 4 shown in FIG. 6 to the second function network element through the NEF. The request response parameter information 4 may be used for indicating that the second function network element accesses the first function network element. When the first function network element detects occurrence of the event (that is, the foregoing subscribed event) corresponding to the target event type currently subscribed, event response information of the event (that is, the foregoing subscribed event) may be directly returned to the second function network element, so that the efficiency of obtaining information by the second function network element can be improved.

As can be seen, in this embodiment of this disclosure, parameter content of the request response parameter information (for example, the request response parameter information 4 shown in FIG. 6) received by the second function network element from the first function network element (or indirectly from the network exposure function device) is different from parameter content of the request response parameter information (for example, the capability invocation response information 1 shown in FIG. 4) directly from the network exposure function device received by the second function network element in the embodiment corresponding to FIG. 3. This is because in this embodiment of this disclosure, after the first function network element (for example, the foregoing AF1) performs the authentication, if the authentication succeeds, a subscription instruction can be directly generated in the first function network element. The subscription instruction may be used for helping the first function network element to determine a target subscription rule between the first function network element and the second function network element. The target subscription rule may be used for indicating that the first function network element has currently completed the subscription of the target event type. Further, the generated request response parameter information for the target event type may be forwarded to the second function network element through the network exposure function device. In this case, the request response parameter information may be used for indicating that the second function network element may currently directly access the first function network element, so that when the event that the first function network element is subscribed by the second function network element occurs, the first function network element may directly return the event response information of the event to the second function network element, thereby improving the efficiency of obtaining information by the second function network element.

Figure 7:
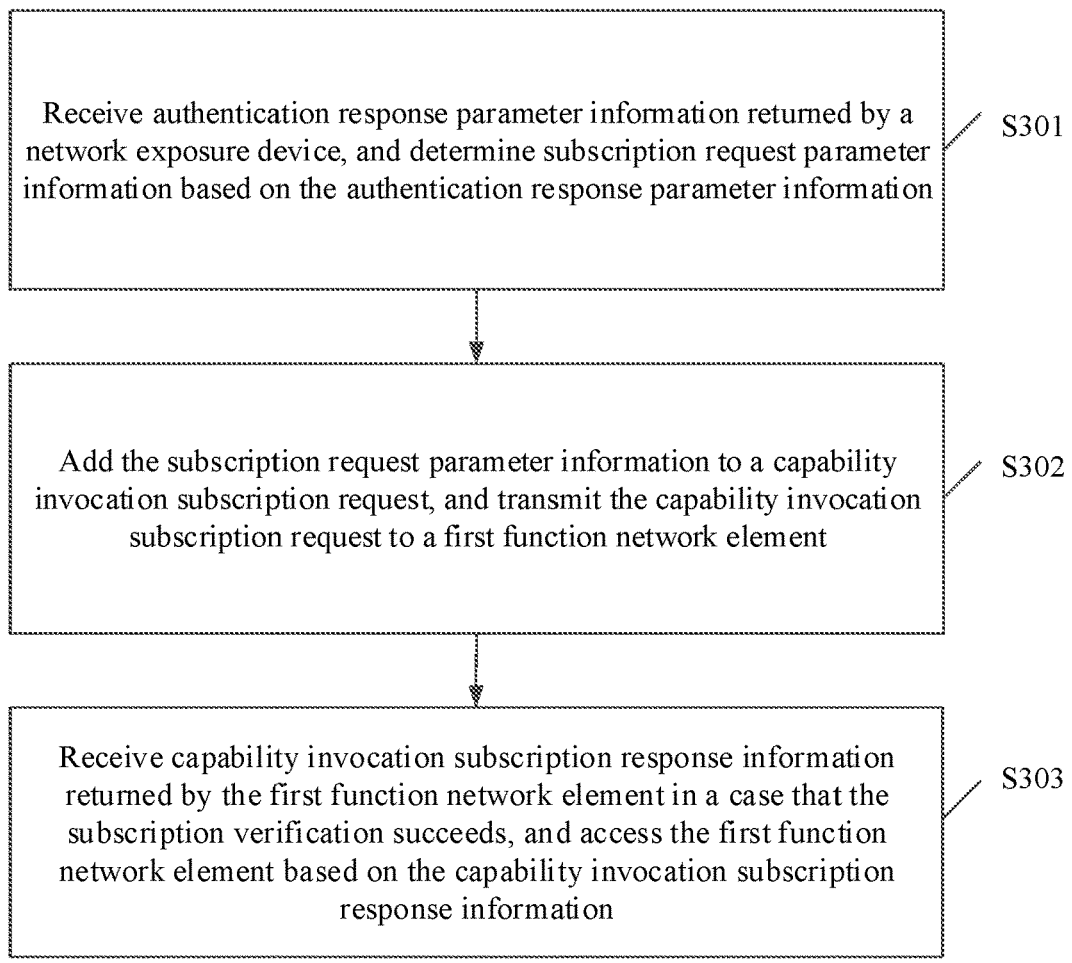
FIG. 7 is a schematic flowchart of obtaining data information according to an embodiment of this disclosure.

FIG. 7 is a schematic flowchart of obtaining data information according to an embodiment of this disclosure. The method may be performed by a computer device, where the computer device may be a second device. For example, the second device may be the edge server 2 in the embodiment shown in FIG. 2 or the central server in the embodiment shown in FIG. 2, which is not limited herein. For ease of understanding, an example is taken in which the second device is the foregoing edge server 2, to illustrate the detailed process of data exchange between a second function network element running in the second device and a first function network element (that is, a first device, for example, the foregoing edge server 1) running in another device. The second function network element may be used to perform the following steps S301 to S303:

S301: Receive authentication response parameter information returned by a network exposure function device, and determine subscription request parameter information based on the authentication response parameter information, the authentication response parameter information being obtained after a network exposure function device performs authentication on a capability invocation request, and the capability invocation request being transmitted by the second function network element. Specifically, the authentication response parameter information is obtained after a network exposure function device performs authentication on a capability invocation request based on the first subscription rules; and the capability invocation request is transmitted by the second function network element based on a first subscription rule.

The authentication response parameter information may include at least one of the following: prompt information for indicating receiving the capability invocation request, second identification information of the first function network element, IP address information of the first function network element, endpoint address information of the first function network element, or access parameter information; and the access parameter information is access token information or target key information configured by the network exposure function device for the second function network element and used for accessing the first function network element.

The subscription request parameter information may include at least: the first identification information of the second function network element, the target event type, the access parameter information, an effective duration for capability invocation, an invocation count threshold for capability invocation, and a time interval for responding to an event.

The first function network element running in the first device may be the application function 1 in the embodiment shown in FIG. 2, and the application function 1 may be the AF1 deployed on the first platform. The second function network element running in the second device may be the application function 2 in the embodiment shown in FIG. 2, and the application function 2 may be the AF2 deployed on the second platform.

In this embodiment of this disclosure, before performing the foregoing step S301, the second function network element may further perform the following step: obtaining first identification information of the second function network element, authentication information of the second function network element, and a target event type requested by the second function network element. Further, the second function network element may determine the request parameter data information based on the first identification information, the authentication information, and the target event type. Further, the second function network element may add the request parameter data information to the capability invocation request, where the capability invocation request may be used for indicating that the network exposure function device authenticates the authentication information based on subscription verification information matching the first identification information, and generates the authentication response parameter information for the capability invocation request after the authentication succeeds and it is determined that the target event type is associated with the first function network element.

For the specific implementation of obtaining the authentication response parameter information by the second function network element, reference may be made to the description of the detailed process of performing authentication by the network exposure function device in the embodiment shown in FIG. 3.

Step S302: Add the subscription request parameter information to a capability invocation subscription request, and transmit the capability invocation subscription request to a first function network element, so that the first function network element performs subscription verification on the capability invocation subscription request according to access parameter information in the subscription request parameter information.

S303: Receive capability invocation subscription response information returned by the first function network element when the subscription verification succeeds, and access the first function network element based on the capability invocation subscription response information.

For the specific implementation of step S301 to step S302, reference may be made to the description of the second function network element in the embodiment corresponding to FIG. 3.

In this embodiment of this disclosure, after receiving the authentication response parameter information returned by the network exposure function device, the second function network element may determine the foregoing subscription request parameter information (for example, the identification information of the AF2, the target event type determined by the foregoing NEF, and the foregoing access parameter information) according to the authentication response parameter information (for example, prompt information for indicating receiving the capability invocation request, the identification information of the foregoing AF1, and the foregoing access parameter information), and may then add the subscription request parameter information to the capability invocation subscription request (for example, the capability invocation subscription request 2 in the embodiment corresponding to FIG. 4 above), so that the first function network element may perform subscription verification on the received capability invocation subscription request. In this way, the second function network element may receive the capability invocation subscription response information for accessing the first function network element when the subscription verification of the first function network element succeeds, thereby improving the efficiency of information obtaining between different network elements.

Figure 8:
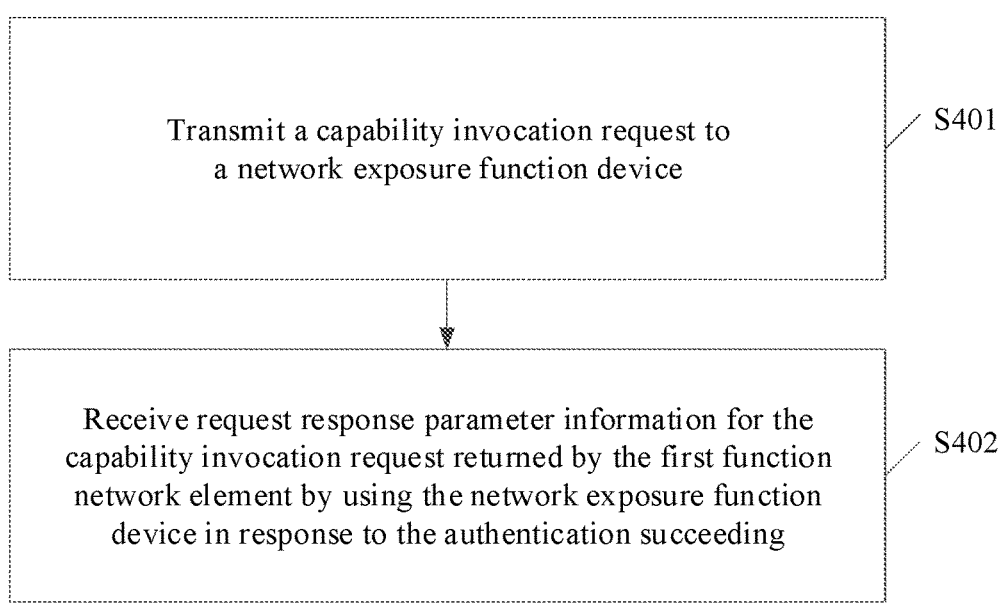
FIG. 8 is a schematic flowchart of obtaining data information according to an embodiment of this disclosure.

FIG. 8 is a schematic flowchart of obtaining data information according to an embodiment of this disclosure. The method may be performed by a computer device, where the computer device may be a second device. For example, the second device may be the edge server 2 in the embodiment shown in FIG. 2 or the central server in the embodiment shown in FIG. 2. For ease of understanding, an example is taken in which the second device is the foregoing edge server 2, to illustrate the specific process of data exchange between a second function network element running in the second device and a first function network element (that is, a first device, for example, the foregoing edge server 1) running in another device. The second function network element may be used to perform the steps in the embodiment shown in FIG. 7, and the second function network element may be further used to perform the following steps S401 to S402:

Step S401: Transmit a capability invocation request to a network exposure function device.

After the second function network element performs step S401, the network exposure function device may directly perform the foregoing second solution. That is, the network exposure function device may forward the capability invocation request to the first function network element based on the second subscription rule, so that the first function network element may perform authentication on the capability invocation request based on request parameter data information carried in the capability invocation request. It may be understood that, a second subscription rule may exist between the first function network element and the network exposure function device.

Step S402: Receive request response parameter information for the capability invocation request returned by the first function network element by using the network exposure function device when the authentication succeeds.

The request response parameter information is used for indicating that the second function network element accesses the first function network element.

For the specific implementation of step S401 to step S402, reference may be made to the description of the second function network element in the embodiment shown in FIG. 5.

Figure 9:
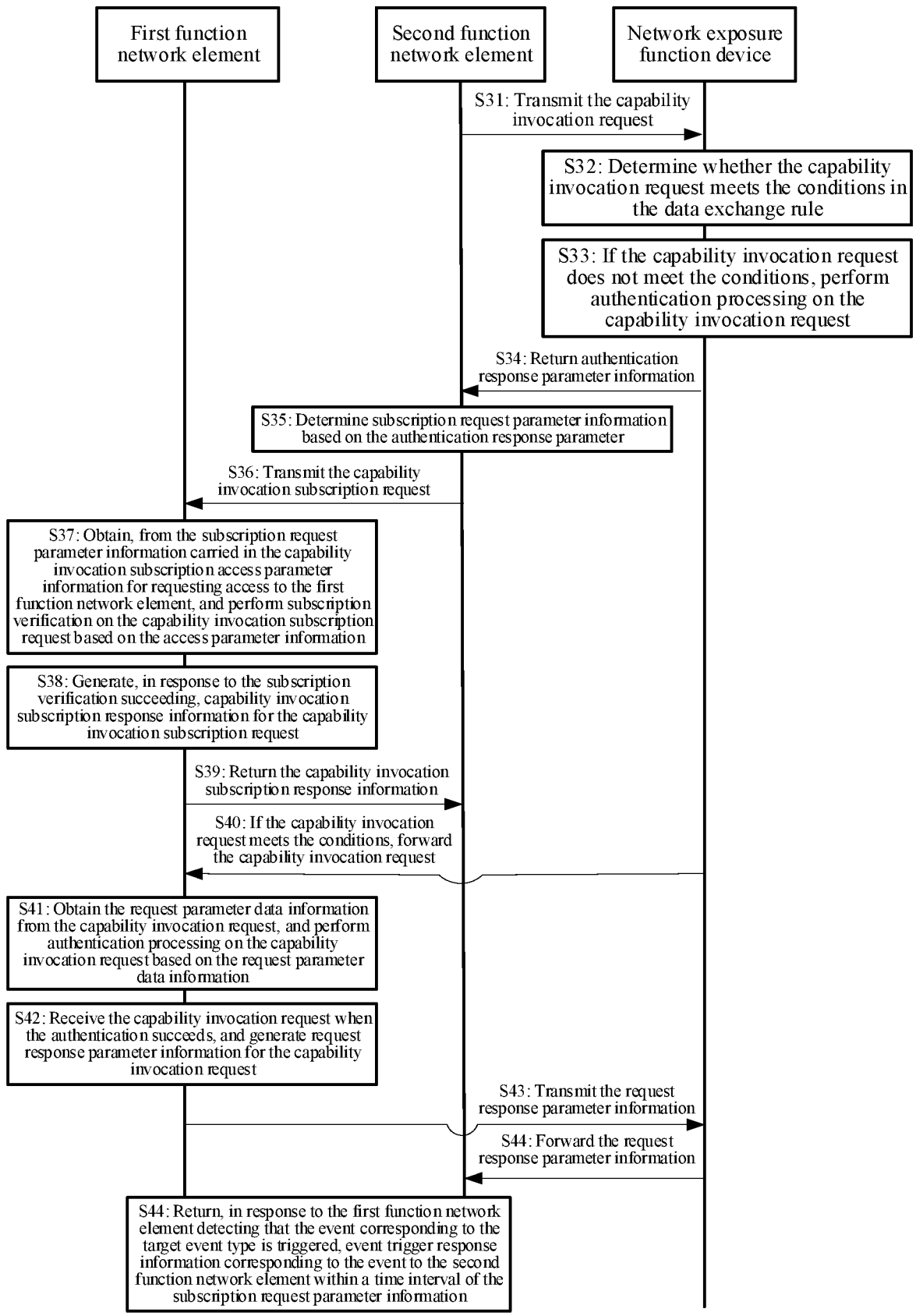
FIG. 9 is an interaction sequence diagram of a data information obtaining method according to an embodiment of this disclosure.

For ease of understanding, FIG. 9 is an interaction sequence diagram of a data information obtaining method according to an embodiment of this disclosure. As shown in FIG. 9, if the second function network element needs to directly obtain capability exposure information from the first function network element, the foregoing third data exchange rule may be used to perform the third solution in this embodiment of this disclosure. For example, the network exposure function device herein may actively determine whether to forward the received capability invocation request to the first function network element. For example, the network exposure function device may determine whether to implement the foregoing first solution or second solution according to the conditions in the third solution.

For example, the second function network element shown in FIG. 9 may perform step S31 to transmit the capability invocation request to the network exposure function device shown in FIG. 9. As shown in FIG. 9, the network exposure function device may use the foregoing third data exchange rule (for example, the policy information of the network operator or the network topology information) to implement the third solution. That is, the network exposure function device may determine whether the capability invocation request meets the conditions in the data exchange rule (for example, the foregoing third data exchange rule) through step S32 shown in FIG. 9. If the capability invocation request does not meet the conditions, the foregoing first solution may be implemented; otherwise, the foregoing second solution may be implemented. For example, if the network exposure function device (that is, the foregoing NEF) determines, according to the policy information of the network operator, that the first function network element running in the first device can provide the services of the event type requested by the second function network element running in the second device, the foregoing second solution can be performed through the network exposure function device, to further jump to perform step S40 shown in FIG. 9.

If the network exposure function device determines, according to the policy information of the network operator, that the authentication of the capability invocation request is performed by the NEF, the foregoing first solution may be implemented through the network exposure function device (that is, the foregoing NEF), so that the NEF can directly perform step S32 shown in FIG. 9, to determine a function network element in the NEF that can provide a capability invocation request for the second function network element (for example, the AF2), and then help the AF2 to obtain the capability exposure information from the determined function network element.

Specifically, as shown in FIG. 9, if the capability invocation request does not meet the conditions, the network exposure function device may perform step S33. That is, authentication may be performed on the capability invocation request in the network exposure function device. Further, after the authentication is completed and it is determined that the authentication of the capability invocation request succeeds, step S34 may be performed to return the capability invocation response information for the capability invocation request to the second function network element. The capability invocation response information may include the authentication response parameter information shown in FIG. 9. For a specific implementation of performing authentication on the capability invocation request in the network exposure function device, reference may be made to the description of the detailed process of obtaining the capability invocation response information 1 in the embodiment shown in FIG. 3.

Further, the second function network element may perform step S35 to determine subscription request parameter information based on the authentication response parameter information. In this case, the second function network element needs to pre-add the subscription request parameter information to the capability invocation subscription request to perform step S36 shown in FIG. 9. That is, the capability invocation subscription request may be directly transmit to the first function network element shown in FIG. 9.

Further, after receiving the capability invocation subscription request, the first function network element may perform step S37 shown in FIG. 9, to obtain, from the subscription request parameter information carried in the capability invocation subscription request, access parameter information for requesting access to the first function network element, and perform subscription verification on the capability invocation subscription request based on the access parameter information. The first function network element may perform steps S38 and S39 shown in FIG. 9 when the subscription verification succeeds, that is, return the capability invocation subscription response information to the second function network element shown in FIG. 9. In this case, the capability invocation subscription response information may carry indication information for indicating reception of the capability invocation subscription request. The first function network element may further return a rejection reason value for indicating rejection of the capability invocation subscription request to the second function network element when the subscription verification fails.

After the first function network element performs step S39, the second function network element is allowed to access the first function network element based on the capability invocation subscription response information. In this way, when detects the occurrence of the event (that is, the foregoing subscribed event) corresponding to the target event type subscribed with the second function network element, the first function network element may jump to perform step S45 shown in FIG. 9, thereby improving the efficiency of information obtaining between network elements through the foregoing first solution.

As shown in FIG. 9, after performing the foregoing step S32, the network exposure function device may further jump to perform step S40 shown in FIG. 9 based on the foregoing second solution. That is, in this case, the network exposure function device may forward the capability invocation request to the first function network element when determining that the capability invocation request transmitted by the AF2 meets the foregoing transit conditions, so that the first function network element may perform step S41 shown in FIG. 9. For example, the first function network element may perform authentication on the capability invocation request based on authentication information of the request parameter data information; carried in the capability invocation request; and perform the following steps S42 and S43 when the authentication succeeds, to return the request response parameter information obtained when the authentication succeeds to the second function network element through the network exposure function device. In this way, when detects the occurrence of the event (that is, the foregoing subscribed event) corresponding to the target event type subscribed with the second function network element, the first function network element may jump to perform step S45 shown in FIG. 9, thereby improving the efficiency of information obtaining between network elements through the foregoing second solution.

Figure 10:
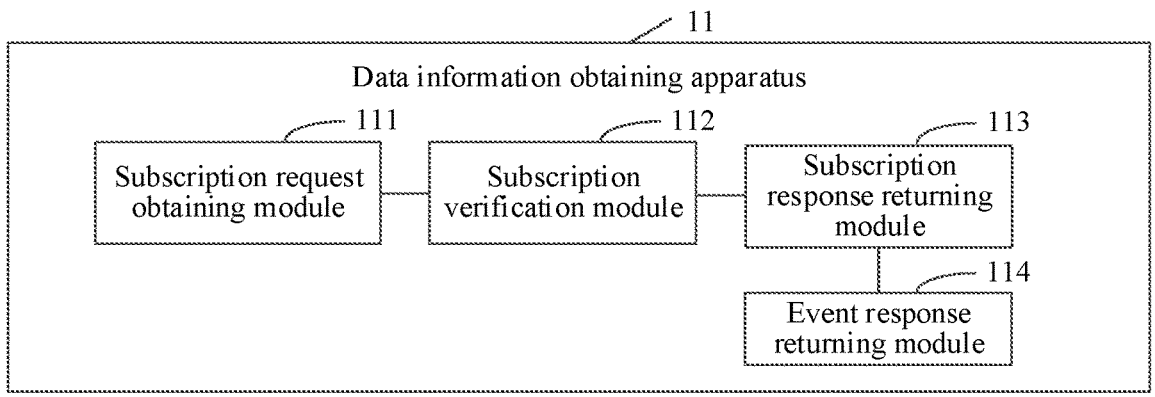
FIG. 10 is a structural diagram of a data information obtaining apparatus according to an embodiment.

Further, FIG. 10 is a structural diagram of a data information obtaining apparatus according to an embodiment. In an embodiment, an apparatus 11 may be a computer program (including program code) running in a computer device. For example, the apparatus 11 may be a first function network element running in the computer device. Alternatively, the apparatus 11 may be deployed on the first function network element, where the first function network element may run in the computer device. The computer device herein may be alternatively a device independent of the first function network element, and the computer device and the first function network element may be deployed on the same MEC platform (for example, the foregoing MEC platform 1).

For ease of understanding, in this embodiment of this disclosure, an example is taken in which the apparatus 11 is the first function network element running in the computer device, and the first function network element may be used to perform the method in the foregoing embodiment shown in FIG. 3. Further, referring to FIG. 10, the apparatus 11 may include: a subscription request obtaining module 111, a subscription verification module 112, and a subscription response returning module 113. Further, the apparatus 11 further includes an event response returning module 114, where the subscription request obtaining module 111 is configured to obtain a capability invocation subscription request transmitted by a second function network element based on subscription request parameter information, the subscription request parameter information being determined by the second function network element according to received authentication response parameter information, the authentication response parameter information being obtained after a network exposure function device performs authentication on a capability invocation request, and the capability invocation request being transmitted by the second function network element;

the subscription verification module 112 is configured to obtain, from the subscription request parameter information carried in the capability invocation subscription request, access parameter information for requesting access to a first function network element, and perform subscription verification on the capability invocation subscription request based on the access parameter information; and the subscription response returning module 113 is configured to generate, when the subscription verification succeeds, capability invocation subscription response information for the capability invocation subscription request, and transmit the capability invocation subscription response information to the second function network element, the capability invocation subscription response information being used for indicating that the second function network element accesses the first function network element.

The authentication response parameter information includes at least authentication success indication information; the authentication success indication information is obtained after the network exposure function device passes the authentication of the capability invocation request and determines to receive the capability invocation request; the capability invocation request is generated by the second function network element based on request parameter data information; a request event type in the request parameter data information includes at least a target event type associated with the first function network element in the authentication response parameter information; and the target event type is the same as an event type of a subscribed event in the capability invocation subscription response information; and the event response returning module 114 is configured to transmit, when detecting that the subscribed event corresponding to the target event type occurs, event response information of the subscribed event to the second function network element within a time interval of the subscription request parameter information.

The first function network element is a first application function entity, and the second function network element is a second application function entity; and the request parameter data information includes at least: identification information of the second application function entity, the target event type, a delay index for responding to an event, an effective duration for capability invocation, an invocation count threshold for capability invocation, and a time interval for responding to an event. The delay index may be, but is not limited to, used for indicating that the network exposure function device determines the first application function entity matching the capability invocation request transmitted by the second application function entity.

For specific implementations of the subscription request obtaining module 111, the subscription verification module 112, the subscription response returning module 113, and the event response returning module 114, reference may be made to the description of the first function network element in the embodiment shown in FIG. 3. In addition, beneficial effects achieved by using the same method are not described herein again.

Figure 11:
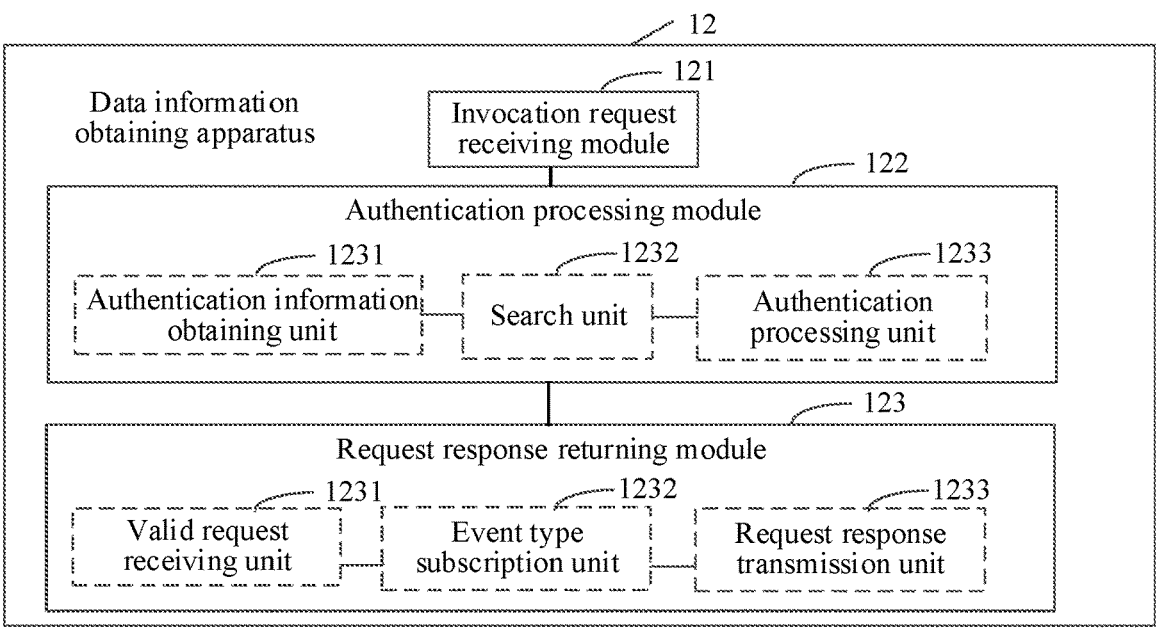
FIG. 11 is a structural diagram of a data information obtaining apparatus according to an embodiment.

Further, FIG. 11 is a structural diagram of a data information obtaining apparatus according to an embodiment. In an embodiment, an apparatus 12 may be a computer program (including program code) running in a computer device. For example, the apparatus 12 may be a first function network element running in the computer device. Alternatively, the apparatus 12 may be deployed on the first function network element, where the first function network element may run in the computer device. The computer device herein may be alternatively a device independent of the first function network element, and the computer device and the first function network element may be deployed on the same MEC platform (for example, the foregoing MEC platform 1).

For ease of understanding, in this embodiment of this disclosure, an example is taken in which the apparatus 12 is the first function network element running in the computer device, and the first function network element may be used to perform the method in the foregoing embodiment shown in FIG. 5. Further, referring to FIG. 11, the apparatus 12 may include: an invocation request receiving module 121, an authentication processing module 122, and a request response returning module 123.

The invocation request receiving module 121 is configured to receive a capability invocation request forwarded by a network exposure function device, the capability invocation request being transmitted by a second function network element, and the capability invocation request carrying request parameter data information;

The authentication processing module 122 is configured to obtain the request parameter data information from the capability invocation request, and perform authentication on the capability invocation request based on the request parameter data information. The authentication processing module 122 includes: an authentication information obtaining unit 1221, a search unit 1222, and an authentication processing unit 1223.

The authentication information obtaining unit 1221 is configured to obtain the authentication information from the capability invocation request;

the search unit 1222 is configured to search for subscription verification information matching the identification information of the second function network element; and the authentication processing unit 1223 is configured to authenticate, when the subscription verification information is found, the authentication information based on the subscription verification information, and authorize the capability invocation request when the authentication succeeds.

For specific implementations of the authentication information obtaining unit 1221, the search unit 1222, and the authentication processing unit 1223, reference may be made to the description of the detailed process of performing authentication by using the first function network element in the embodiment shown in FIG. 5.

The request response returning module 123 is configured to generate, when determining that the authentication of the capability invocation request succeeds, request response parameter information for the capability invocation request, and forward the request response parameter information to the second function network element by using the network exposure function device, the request response parameter information being used for indicating that a second function network element accesses a first function network element.

The request parameter data information carries a target event type requesting a subscription; and the request response returning module 123 includes: a valid request receiving unit 1231, an event type subscription unit 1232, and a request response transmitting unit 1233.

The valid request receiving unit 1231 is configured to determine, when determining that the authentication of the capability invocation request succeeds, that the capability invocation request is a valid request, and generate a subscription instruction for the valid request;

the event type subscription unit 1232 is configured to determine the target event type as a subscription event type based on the subscription instruction, and generate request response parameter information for the subscription event type; and the request response transmitting unit 1233 is configured to transmit the request response parameter information to the network exposure function device, so that the network exposure function device forwards the request response parameter information to the second function network element.

For specific implementations of the valid request receiving unit 1231, the event type subscription unit 1232, and the request response transmitting unit 1233, reference may be made to the description of the detailed process of generating the request response parameter information in the embodiment shown in FIG. 5.

The first function network element is deployed on a first platform; the second function network element is deployed on a second platform; and the first platform is different from the second platform, or the first platform and the second platform are the same platform.

For specific implementations of the invocation request receiving module 121, the authentication processing module 122, and the request response returning module 123, reference may be made to the description of step S201 to step S203 in the embodiment shown in FIG. 5. In addition, beneficial effects achieved by using the same method are not described herein again.

Figure 12:
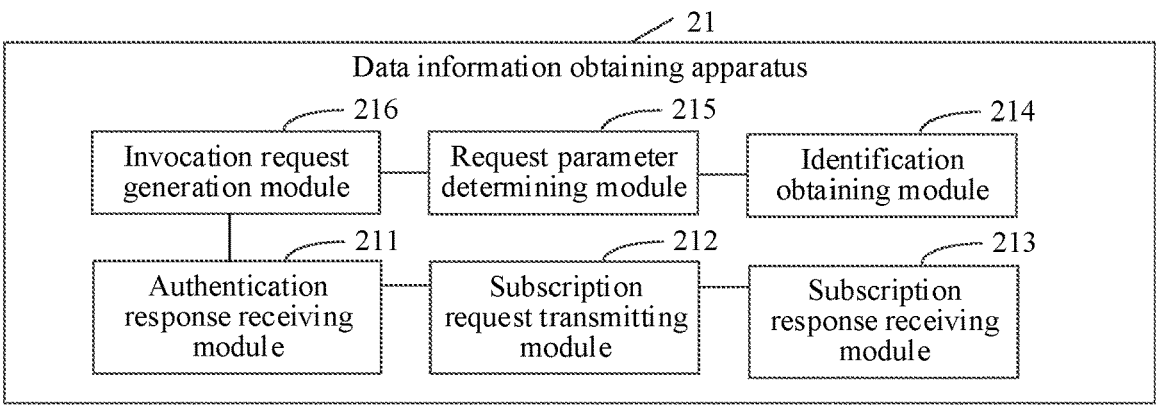
FIG. 12 is a structural diagram of a data information obtaining apparatus according to an embodiment.

Further, FIG. 12 is a structural diagram of a data information obtaining apparatus according to an embodiment. In an embodiment, an apparatus 21 may be a computer program (including program code) running in a computer device. For example, the apparatus 21 may be a second function network element running in the computer device. Alternatively, the apparatus 21 may be deployed on the second function network element, where the second function network element may run in the computer device. The computer device herein may be alternatively a device independent of the second function network element, and the computer device and the second function network element may be deployed on the same MEC platform (for example, the foregoing MEC platform 2).

For ease of understanding, in this embodiment of this disclosure, an example is taken in which the apparatus 21 is the second function network element running in the computer device, and the second function network element may correspondingly perform the method in the foregoing embodiment shown in FIG. 7. Further, referring to FIG. 12, the apparatus 21 may include: an authentication response receiving module 211, a subscription request transmitting module 212, and a subscription response receiving module 213. Further, the apparatus 21 further includes: an identification obtaining module 214, a request parameter determining module 215, and an invocation request generation module 216, where the authentication response receiving module 211 is configured to receive authentication response parameter information returned by a network exposure function device, and determine subscription request parameter information based on the authentication response parameter information, the authentication response parameter information being obtained after the network exposure function device performs authentication processing on a capability invocation request transmitted by a second function network element;

the subscription request transmitting module 212 is configured to add the subscription request parameter information to a capability invocation subscription request, and transmit the capability invocation subscription request to a first function network element, so that the first function network element performs subscription verification on the capability invocation subscription request according to access parameter information in the subscription request parameter information; and the subscription response receiving module 213 is configured to receive capability invocation subscription response information returned by the first function network element when the subscription verification succeeds, and access the first function network element based on the capability invocation subscription response information.

The identification obtaining module 214 is configured to obtain first identification information of the second function network element, authentication information of the second function network element, and a target event type requested by the second function network element;

the request parameter determining module 215 is configured to determine the request parameter data information based on the first identification information, the authentication information, and the target event type; and the invocation request generation module 216 is configured to add the request parameter data information to the capability invocation request, where the capability invocation request is used for indicating that the network exposure function device authenticates the authentication information based on subscription verification information matching the first identification information, and generates the authentication response parameter information for the capability invocation request after the authentication succeeds and it is determined that the target event type is associated with the first function network element.

The authentication response parameter information includes at least one of the following: prompt information for indicating receiving the capability invocation request, second identification information of the first function network element, IP address information of the first function network element, endpoint address information of the first function network element, or the access parameter information; and the access parameter information is access token information or target key information configured by the network exposure function device for the second function network element and used for accessing the first function network element.

The subscription request parameter information includes at least: the first identification information of the second function network element, the target event type, the access parameter information, a delay index for responding to an event, an effective duration for capability invocation, an invocation count threshold for capability invocation, and a time interval for responding to an event.

In addition to the authentication response receiving module 211, the subscription request transmitting module 212, and the subscription response receiving module 213, further, the apparatus 21 further includes: the identification obtaining module 214, the request parameter determining module 215, and the invocation request generation module 216, whose specific implementations may be referred to the description of the second function network element in the embodiment shown in FIG. 3 or FIG. 7. In addition, beneficial effects achieved by using the same method are not described herein again.

Figure 13:
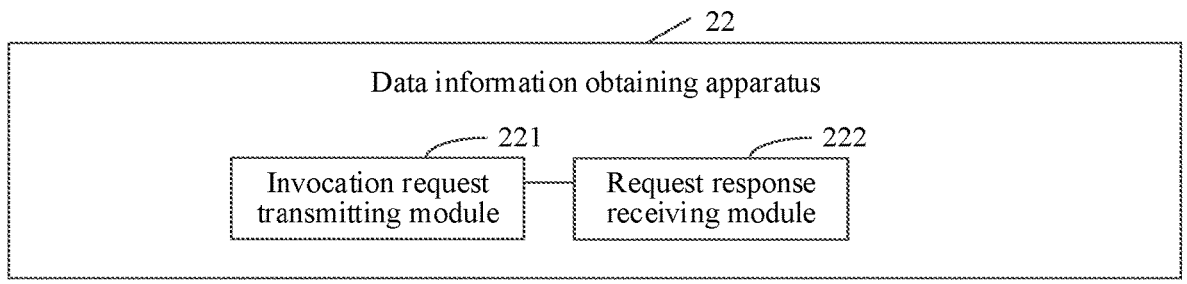
FIG. 13 is a structural diagram of a data information obtaining apparatus according to an embodiment.

Further, FIG. 13 is a structural diagram of a data information obtaining apparatus according to an embodiment. In an embodiment, an apparatus 22 may be a computer program (including program code) running in a computer device. For example, the apparatus 22 may be a second function network element running in the computer device. Alternatively, the apparatus 22 may be deployed on the second function network element, where the second function network element may run in the computer device. The computer device herein may be alternatively a device independent of the second function network element, and the computer device and the second function network element may be deployed on the same MEC platform (for example, the foregoing MEC platform 2).

For ease of understanding, in this embodiment of this disclosure, an example is taken in which the apparatus 22 is the second function network element running in the computer device, and the second function network element may correspondingly perform the method in the foregoing embodiment shown in FIG. 8. Further, referring to FIG. 13, the apparatus 22 may include: an invocation request transmitting module 221 and a request response receiving module 222.

the invocation request transmitting module 221 is configured to transmit a capability invocation request to a network exposure function device, so that the network exposure function device forwards the capability invocation request to a first function network element, the first function network element being configured to perform authentication on the capability invocation request based on request parameter data information carried in the capability invocation request; and the request response receiving module 222 is configured to receive request response parameter information returned by the first function network element by using the network exposure function device when the authentication succeeds, the request response parameter information being used for indicating that a second function network element accesses a first function network element.

For specific implementations of the invocation request transmitting module 221 and the request response receiving module 222, reference may be made to the description of the second function network element in the foregoing embodiment shown in FIG. 5 or FIG. 8. In addition, beneficial effects achieved by using the same method are not described herein again.

Figure 14:
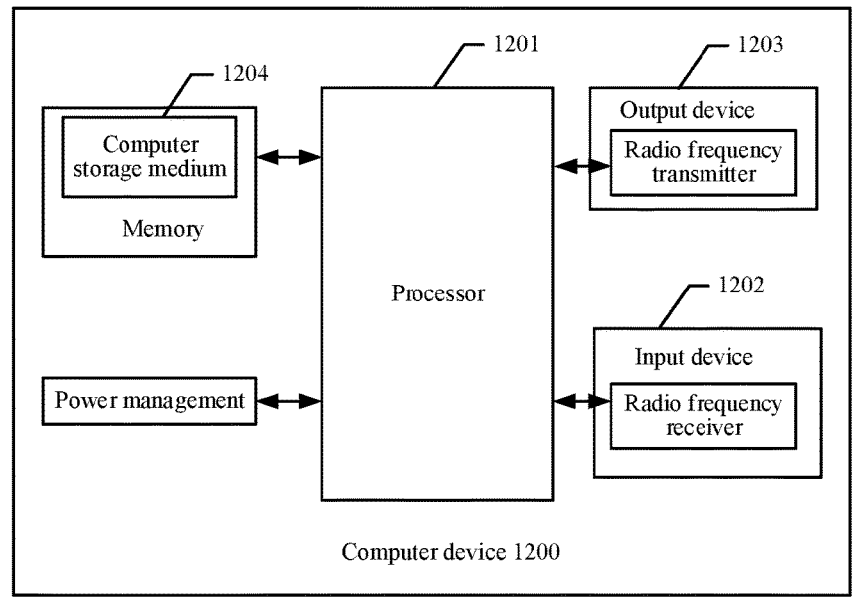
FIG. 14 is a schematic structural diagram of a computer device according to an embodiment of this disclosure.

Further, FIG. 14 is a schematic structural diagram of a computer device 1200 according to an embodiment of this disclosure. Shown in FIG. 14, the computer device 1200 includes at least a processor 1201, an input device 1202, an output device 1203, and a computer storage medium 1204. The processor 1201, the input device 1202, the output device 1203, and the computer storage medium 1204 may be connected by a bus or in another manner. The computer storage medium 1204 may be stored in a memory of the computer device. The computer storage medium 1204 is configured to store a computer program. The computer program includes program instructions. The processor 1201 is configured to execute the program instructions stored in the computer storage medium 1204. The processor 1201 (or referred to as a central processing unit (CPU)) is a computing core and a control core of the computer device, is suitable for implementing one or more instructions, and is specifically suitable for loading and executing one or more instructions to implement a corresponding method procedure or a corresponding function.

The embodiments of the present invention further provide a computer storage medium 1204, and the computer storage medium is a memory device in a computer device and is configured to store programs and data. The computer storage medium provides a storage space, the storage space further stores one or more instructions suitable for being loaded and executed by the processor 1201. The instructions may be one or more computer programs (including program code). The computer storage medium herein may be a high-speed RAM memory, or may be a non-volatile memory, such as at least one magnetic disk storage. The computer storage medium may be at least one computer storage medium far away from the foregoing processor.

In an embodiment, the processor 1201 loads and executes one or more instructions stored in the computer storage medium, to cause the computer device including the processor 1201 to implement the method in the embodiments shown in FIG. 3 to FIG. 9. In an embodiment, the computer device may perform the description of the data information obtaining method in the foregoing embodiment corresponding to FIG. 3, FIG. 5, FIG. 7, or FIG. 8, may perform the description of the data information obtaining apparatus 11 in the foregoing embodiment corresponding to FIG. 10 or the description of the data information obtaining apparatus 12 in the embodiment corresponding to FIG. 11, and may further perform the description of the data information obtaining apparatus 21 in the foregoing embodiment corresponding to FIG. 12 or the description of the data information obtaining apparatus 22 in the foregoing embodiment corresponding to FIG. 13. In addition, beneficial effects achieved by using the same method are not described herein again.

Figure 15:
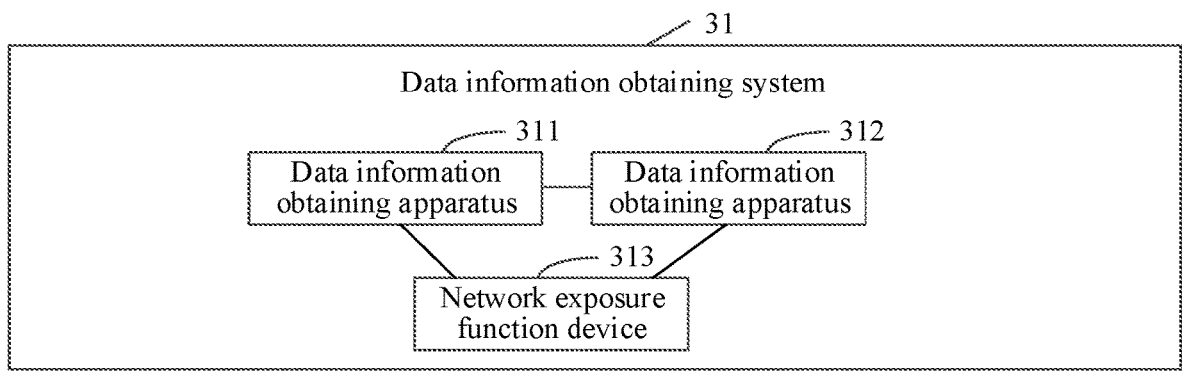
FIG. 15 is a schematic structural diagram of a data information obtaining system according to an embodiment of this disclosure.

Further, FIG. 15 is a schematic structural diagram of a data information obtaining system according to an embodiment of this disclosure. The data information obtaining system 31 may include at least a data information obtaining apparatus 311, a data information obtaining apparatus 312, and a network exposure function device 313. The data information obtaining apparatus 311 may be the data information obtaining apparatus 11 in the embodiment corresponding to FIG. 10 or the data information obtaining apparatus 12 in the embodiment corresponding to FIG. 11. The data information obtaining apparatus 311 may be integrated in the edge server 1 of the embodiment corresponding to FIG. 2 above. In addition, the network exposure function device 313 may be the network exposure function in the foregoing embodiment corresponding to FIG. 2. In addition, it may be understood that the data information obtaining apparatus 312 may be the data information obtaining apparatus 21 in the embodiment corresponding to FIG. 12 or the data information obtaining apparatus 22 in the embodiment corresponding to FIG. 13. The data information obtaining apparatus 312 may be integrated in the edge server 2 of the embodiment corresponding to FIG. 2 above. In addition, beneficial effects achieved by using the same method are not described herein again. For technical details that are not disclosed in the embodiments of the data information obtaining system in this application, reference may be made to the descriptions of the method embodiments of this disclosure.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

A person of ordinary skill in the art may understand that all or some of the procedures of the methods of the foregoing embodiments may be implemented by a computer program instructing relevant hardware. The program may be stored in a computer readable storage medium. When the program is executed, the program may include the procedures of the embodiments of the foregoing methods. The storage medium may be a magnetic disk, an optical disc, read-only memory (ROM), a random access memory (RAM) or the like.

Disclosed above are merely exemplary embodiments of the present invention, and are certainly not intended to limit the patent scope of the present invention. Therefore, an equivalent change made according to the claims of the present invention still falls within the scope of the present invention.

What is claimed is:

1. A data information obtaining method, performed by a first function network element, the method comprising:

obtaining a capability invocation subscription request transmitted by a second function network element based on subscription request parameter information, the subscription request parameter information being determined by the second function network element according to received authentication response parameter information, the authentication response parameter information being obtained by a network exposure function device performing authentication on a capability invocation request, and the capability invocation request being transmitted by the second function network element;

obtaining, from the subscription request parameter information carried in the capability invocation subscription request, access parameter information for requesting access to the first function network element, and performing subscription verification on the capability invocation subscription request based on the access parameter information; and in response to a success of the subscription verification, generating capability invocation subscription response information for the capability invocation subscription request, and transmitting the capability invocation subscription response information to the second function network element, the capability invocation subscription response information being for indicating that the second function network element has access to the first function network element.

2. The method according to claim 1, wherein the authentication response parameter information comprises authentication success indication information, the authentication success indication information is obtained after the network exposure function device passes the authentication of the capability invocation request and determines to receive the capability invocation request, the capability invocation request is generated by the second function network element based on request parameter data information; a request event type in the request parameter data information comprises a target event type associated with the first function network element in the authentication response parameter information, and the target event type is identical with an event type of a subscribed event in the capability invocation subscription response information, and the method further comprises:
in response to detecting occurrence of a subscribed event with the target event type, transmitting event response information of the subscribed event to the second function network element within a time interval of the subscription request parameter information.

3. The method according to claim 2, wherein the first function network element is a first application function entity, and the second function network element is a second application function entity.

4. The method according to claim 3, the request parameter data information comprises at least one of:
identification information of the second application function entity,
the target event type,
a delay index for responding to an event,
an effective duration for capability invocation,
an invocation count threshold for capability invocation, or
a time interval for responding to an event.

* * * * *